United States Patent
Müller et al.

(10) Patent No.: US 7,238,750 B2
(45) Date of Patent: Jul. 3, 2007

(54) POLYMERS

(75) Inventors: Beat Müller, Marly (CH); Alain Laurent, Estavayer-le-Lac (CH); Veerle Coessens, Basel (CH); Aaldert Rens Molenberg, Basel (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 11/452,535

(22) Filed: Jun. 14, 2006

(65) Prior Publication Data

US 2006/0235162 A1 Oct. 19, 2006

Related U.S. Application Data

(63) Continuation of application No. 09/815,674, filed on Mar. 23, 2001, now Pat. No. 7,091,283.

(30) Foreign Application Priority Data

Mar. 24, 2000 (EP) ................... 00106395

(51) Int. Cl.
*C08F 259/02* (2006.01)
(52) U.S. Cl. ...................... 525/292; 526/211; 526/214; 526/220
(58) Field of Classification Search ................ 525/292; 526/211, 214, 220
See application file for complete search history.

(56) References Cited

U.S. PATENT DOCUMENTS

| | | | | | |
|---|---|---|---|---|---|
| 4,229,273 | A | * | 10/1980 | Wajs | 522/138 |
| 5,227,432 | A | * | 7/1993 | Jung | 525/286 |
| 5,336,797 | A | * | 8/1994 | McGee et al. | 556/419 |
| 5,387,663 | A | * | 2/1995 | McGee et al. | 526/279 |
| 5,449,729 | A | * | 9/1995 | Lai | 526/286 |
| 5,505,884 | A | * | 4/1996 | Burke et al. | 264/1.1 |
| 5,563,184 | A | * | 10/1996 | McGee et al. | 523/107 |
| 5,708,094 | A | * | 1/1998 | Lai et al. | 525/296 |
| 5,981,669 | A | * | 11/1999 | Valint et al. | 525/477 |
| 5,981,675 | A | * | 11/1999 | Valint et al. | 526/279 |

FOREIGN PATENT DOCUMENTS

| | | | |
|---|---|---|---|
| DE | 3710343 A1 | * | 3/1987 |
| EP | 0331633 A2 | * | 2/1989 |
| WO | WO 92/09421 | * | 6/1992 |
| WO | WO 92/18548 | * | 10/1992 |
| WO | WO 93/09084 | * | 5/1993 |

* cited by examiner

Primary Examiner—Bernard Lipman
(74) Attorney, Agent, or Firm—Jian Zhou

(57) ABSTRACT

The invention relates to novel crosslinkable copolymers which are obtainable by
(a) copolymerizing at least one hydrophilic monomer having one ethylenically unsaturated double bond and at least one crosslinker comprising two or more ethylenically unsaturated double bonds in the presence of a chain transfer agent having a functional group; and
(b) reacting one or more functional groups of the resulting copolymer with an organic compound having an ethylenically unsaturated group.

The crosslinkable copolymers of the invention are especially useful for the manufacture of biomedical mouldings, for example ophthalmic mouldings such as in particular contact lenses.

11 Claims, No Drawings

POLYMERS

This application is a continuation of U.S. patent application Ser. No. 09/815,674 filed Mar. 23, 2001, now U.S. Pat. No. 7,091,283, which claims benefit under 35 U.S.C. § 119(a)-(d) or §365(b) of European Patent Application No. 00106395.7, filed on Mar. 24, 2000.

The present invention relates to novel crosslinkable polymers, to a process for the preparation thereof and to the use thereof for the manufacture of mouldings, especially biomedical mouldings such as contact lenses.

WO 92/09639 discloses polymerizable macrocomonomers which are obtained by co-telomerizing two or more mono-ethylenically unsaturated monomers in the presence of a functional chain transfer agent and capping the resultant copolymer with a compound providing a C═C double bond. The macrocomonomers are then copolymerized with further comonomers, crosslinkers and the like in a suitable mould in order to yield mouldings, for example contact lenses. This synthetic route is complicated, because it includes two reaction steps, (i) preparation of the polymerizable macrocomonomer and (ii) copolymerization of said macromonomer with other comonomers, and at least two purification steps—the macromonomer and, even more important, the final moulding both have to be purified from unreacted monomers. It would therefore be highly desirable to simplify this process, for example by providing just one crosslinkable macromonomer having all the desired properties which upon crosslinking yields a moulding that is ready for use without a subsequent purification step.

Moreover, in today's field of biomedical mouldings it is often desired to impart one polymer material with different desired properties which oppose each other. For example, concerning the field of contact lenses, a suitable bulk material should provide a good combination of high oxygen permeability, high hydrophilicity and ion permeability along With good mechanical properties. In order to balance the different properties, it would be highly desirable to have a system of polymerizable compounds and polymerization controlling agents which would allow to design specific bulk materials just by simple variation of the stoichiometric amounts of the ingredients.

Surprisingly, there now has been found such a system leading to novel crosslinkable copolymers which fulfill the above requirements. The novel copolymers are obtainable by incorporating a crosslinker in the above described telomerization reaction.

The present invention therefore in one aspect relates to a crosslinkable or polymerizable prepolymer that is obtainable by
(a) copolymerizing at least one hydrophilic monomer having one ethylenically unsaturated double bond and at least one crosslinker comprising two or more ethylenically unsaturated double bonds in the presence of a chain transfer agent having a functional group; and
(b) reacting one or more functional groups of the resulting copolymer with an organic compound having an ethylenically unsaturated group.

Suitable hydrophilic monomers in step (a) are in principle any mono-ethylenically unsaturated compound comprising a non-ionic, anionic, cationic or zwitterionic substituent. A hydrophilic comonomer in this context is understood as meaning a monomer which typically gives, as a homopolymer, a polymer which is water-soluble or can absorb at least 10% by weight of water.

A non-ionic substituent of the hydrophilic monomer includes, for example, $C_1$-$C_6$-alkyl which is substituted by one or more same or different substituents selected from the group consisting of —OH, $C_1$-$C_4$-alkoxy and —NRR', wherein R and R' are each independently of another hydrogen or unsubstituted or hydroxy-substituted $C_1$-$C_6$-alkyl or phenyl; phenyl which is substituted by hydroxy, $C_1$-$C_4$-alkoxy or —NRR', wherein R and R' are as defined above; a radical —COOY, wherein Y is $C_1$-$C_4$-alkyl, $C_1$-$C_{24}$-alkyl which is substituted, for example, by hydroxy, $C_0$-$C_4$-alkoxy, —O—Si(CH$_3$)$_3$, —NRR' wherein R and R' are as defined above, a radical —O—(CH$_2$CH$_2$O)$_{1-24}$-E wherein E is hydrogen or $C_1$-$C_6$-alkyl, or a radical —NH—C(O)—O-G, wherein —O-G is the radical of a saccharide with 1 to 8 sugar units or is a radical —O—(CH$_2$CH$_2$O)$_{1-24}$-E, wherein E is as defined above, or Y is $C_5$-$C_8$-cycloalkyl which is unsubstituted or substituted by $C_1$-$C_4$-alkyl or $C_1$-$C_4$-alkoxy, or is unsubstituted or $C_1$-$C_4$-alkyl- or $C_1$-$C_4$-alkoxy-substituted phenyl or $C_7$-$C_{12}$-aralkyl; —CONY$_1$Y$_2$ wherein Y$_1$ and Y$_2$ are each independently hydrogen, $C_1$-$C_4$-alkyl, $C_1$-$C_{12}$-alkyl, which is substituted, for example by hydroxy, $C_1$-$C_4$-alkoxy, a radical —CH(OR$_{18}$)$_2$ wherein R is is hydrogen, $C_1$-$C_4$-alkyl or $C_2$-$C_5$-alkanoyl, or a radical —O—(CH$_2$CH$_2$O)$_{1-24}$-E wherein E is as defined above, or Y$_1$ and Y$_2$ together with the adjacent N-atom form a five- or six-membered heterocyclic ring having no additional heteroatom or one additional oxygen or nitrogen atom; a radical —OY$_3$, wherein Y$_3$ is hydrogen; $C_1$-$C_4$-alkyl or $C_1$-$C_{12}$-alkyl which is substituted by —NRR'; or is a radical —C(O)—$C_1$-$C_4$-alkyl; and wherein R and R' are as defined above; or a five- to seven-membered heterocyclic radical having at least one N-atom and being bound in each case via said nitrogen atom.

Suitable anionic substituents of the hydrohilic monomer include for example $C_1$-$C_6$-alkyl which is substituted by —SO$_3$H, —OSO$_3$H, —OPO$_3$H$_2$ and —COOH; phenyl which is substituted by one or more same or different substituents selected from the group consisting of —SO$_3$H, —COOH, —OH and —CH$_2$—SO$_3$H; —COOH; a radical —COOY$_4$, wherein Y$_4$ is $C_1$-$C_{24}$-alkyl which is substituted for example by —COOH, —SO$_3$H, —OSO$_3$H, —OPO$_3$H$_2$ or by a radical —NH—C(O)—O-G' wherein G' is the radical of an anionic carbohydrate; a radical —CONY$_5$Y$_6$ wherein Y$_5$ is $C_1$-$C_{24}$-alkyl which is substituted by —COOH, —SO$_3$H, —OSO$_3$H, or —OPO$_3$H$_2$ and Y$_6$ independently has the meaning of Y$_5$ or is hydrogen or $C_1$-$C_{12}$-alkyl; or —SO$_3$H; or a salt thereof, for example a sodium, potassium, ammonium or the like salt thereof.

Suitable cationic substituents of the hydrophilic monomer include $C_1$-$C_{12}$-alkyl which is substituted by a radical —NRR'R''$^+$An$^-$, wherein R, R' and R'' are each independently of another hydrogen or unsubstituted or hydroxy-substituted $C_1$-$C_6$-alkyl or phenyl, and An$^-$ is an anion; or a radical —C(O)OY$_7$, wherein Y$_7$ is $C_1$-$C_{24}$-alkyl which is substituted by —NRR'R''$^+$An$^-$ and is further unsubstituted or substituted for example by hydroxy, wherein R, R', R''and An$^-$ are as defined above.

Suitable zwitterionic substituents of the hydrophilic monomer include a radical —R$_1$-Zw, wherein R$_1$ is a direct bond or a functional group, for example a carbonyl, carbonate, amide, ester, dicarboanhydride, dicarboimide, urea or urethane group; and Zw is an aliphatic moiety comprising one anionic and one cationic group each.

The following preferences apply to the hydrophilic substituents of the hydrophilic monomer: (i) non-ionic substituents:

Preferred alkyl substituents are $C_1$-$C_4$-alkyl, in particular $C_1$-$C_2$-alkyl, which is substituted by one or more substituents selected from the group consisting of —OH and —NRR', wherein R and R' are each independently of another hydrogen or $C_1$-$C_4$-alkyl, preferably hydrogen, methyl or ethyl and particularly preferably hydrogen or methyl, for example —$CH_2$—$NH_2$, —$CH_2$—$N(CH_3)_2$.

Preferred phenyl substituents are phenyl which is substituted by —$NH_2$ or $N(C_1$-$C_2$-alkyl$)_2$, for example o-, m- or p-aminophenyl.

In case that the hydrophilic substituent is a radical —COOY, Y as alkyl is preferably $C_1$-$C_2$-alkyl; Y as substituted alkyl is preferably $C_1$-$C_{12}$-alkyl, more preferably $C_1$-$C_6$-alkyl, even more preferably $C_1$-$C_4$-alkyl and particularly preferably $C_1$-$C_2$-alkyl, each of which being substituted as mentioned above. In case that the alkyl radical Y is substituted by —NRR', the above-given meanings and preferences apply for R and R'. Examples of suitable saccharide substituents —O-G of the alkyl radical Y that is substituted by —NH—C(O)—O-G are the radical of a mono- or disaccharide, for example glucose, acetyl glucose, methyl glucose, glucosamine, N-acetyl glucosamine, glucono lactone, mannose, galactose, galactosamine, N-acetyl galactosamine, fructose, maltose, lactose, fucose, saccharose or trehalose, the radical of an anhydrosaccharide such as levoglucosan, the radical of a glucosid such as octylglucosid, the radical of a sugar alcohol such as sorbitol, the radical of a sugar acid derivative such as lactobionic acid amide, or the radical of an oligosaccharide with a maximum of 8 sugar units, for example fragments of a cyclodextrin, starch, chitosan, maltotriose or maltohexaose. The radical —O-G preferably denotes the radical of a mono- or disaccharide or the radical of a cyclodextrin fragment with a maximum of 8 sugar units. Particular preferred saccharide radicals —O-G are the radical of trehalose or the radical of a cyclodextrin fragment. In case that the alkyl radical Y is substituted by a radical —O—$(CH_2CH_2O)_{1-24}$-E or —NH—C(O)—O-G wherein —O-G is —O—$(CH_2CH_2O)_{1-24}$-E, the number of ($CH_2CH_2O$) units is preferably from 1 to 12 in each case and more preferably from 2 to 8. E is preferably hydrogen or $C_1$-$C_2$-alkyl.

Y as $C_5$-$C_8$-cycloalkyl is for example cyclopentyl or preferably cyclohexyl, each of which being unsubstituted or substituted for example by 1 to 3 $C_1$-$C_2$-alkyl groups Y as $C_7$-$C_{12}$-aralkyl is for example benzyl.

Preferred nonionic radicals —COOY are those wherein Y is $C_1$-$C_2$-alkyl; or $C_2$-$C_6$-alkyl which is substituted by one or two substituents selected from the group consisting of hydroxy; $C_1$-$C_2$-alkoxy; —O—$Si(CH_3)_3$; and —NRR' wherein R and R' are each independently of another hydrogen or $C_1$-$C_4$-alkyl; or Y is a radical —$CH_2CH_2$—O—$(CH_2CH_2O)_{1-12}$-E wherein E is hydrogen or $C_1$-$C_2$-alkyl; or is a radical —$C_2$-$C_4$-alkylene-NH—C(O)—O-G, wherein —O-G is the radical of a saccharide.

More preferred non-ionic radicals —COOY are those wherein Y is $C_1$-$C_2$-alkyl; or $C_2$-$C_4$-alkyl which is substituted by one or two substituents selected from the group consisting of —OH and —NRR' wherein R and R' are each independently of another hydrogen or $C_1$-$C_2$-alkyl; or a radical —$CH_2CH_2$—O—$(CH_2CH_2O)_{1-12}$-E wherein E is hydrogen or $C_1$-$C_2$-alkyl; or is a radical —$C_2$-$C_4$-alkylene-NH—C(O)—O-G wherein —O-G is the radical of a saccharide.

Particularly preferred radicals —COOY comprise those wherein Y is $C_1$-$C_2$-alkyl, particularly methyl; or $C_2$-$C_3$-alkyl, which is unsubstituted or substituted by hydroxy or N,N-di-$C_1$-$C_2$-alkylamino, or is a radical —$C_2$-$C_3$-alkylene-NH—C(O)—O-G wherein —O-G is the radical of trehalose or the radical of a cyclodextrin fragment with a maximum of 8 sugar units.

Preferred non-ionic substituents —C(O)—$NY_1Y_2$ are those wherein $Y_1$ and $Y_2$ are each independently of the other hydrogen, $C_1$-$C_2$-alkyl or $C_1$-$C_6$-alkyl which is substituted by hydroxy or by a radical —$CH(OR_{18})$ wherein $R_{18}$ is hydrogen, $C_1$-$C_4$-alkyl, acetyl or propionyl; or $Y_1$ and $Y_2$ together with the adjacent N-atom form a heterocyclic 6-membered ring having no further heteroatom or having one further N- or O-atom. Even more preferred meanings of $Y_1$ and $Y_2$, independently of each other, are hydrogen, $C_1$-$C_2$-alkyl or $C_1$-$C_4$-alkyl which is unsubstituted or substituted by hydroxy or a radical —$CH(OR_{18})_2$ wherein $R_{18}$ is hydrogen or $C_1$-$C_2$-alkyl; or $Y_1$ and $Y_2$ together with the adjacent N-atom form a N—$C_1$-$C_2$-alkylpiperazino or morpholino ring. Particularly preferred non-ionic radicals —C(O)—$NY_1Y_2$ are those wherein one of $Y_1$ and $Y_2$ is hydrogen, methyl or ethyl and the other one is hydrogen, methyl, ethyl, 2-hydroxyethyl or a radical —$(CH_2)_{1-3}$—CH($OC_1$-$C_2$-alkyl$)_2$; or $Y_1$ and $Y_2$ together with the adjacent N-atom form a morpholino ring.

Preferred non-ionic substituents —$OY_3$ are those wherein $Y_3$ is hydrogen, $C_1$-$C_2$-alkyl, $C_1$-$C_4$-alkyl which is substituted by —$NH_2$ or —$N(C_1$-$C_2$-alkyl$)_2$, or is a group —C(O)$C_1$-$C_2$-alkyl. $Y_3$ is particularly preferred hydrogen or acetyl.

Preferred non-ionic heterocyclic substituents are a 5- or 6-membered heteroaromatic or heteroaliphatic radical having one N-atom and in addition no further heteroatom or an additional N- or O-heteroatom, or is a 5 to 7-membered lactame. Examples of such heterocyclic radicals are N-pyrrolidonyl, 2- or 4-pyridinyl, 2-methylpyridin-5-yl, 2-, 3-oder 4-hydroxypyridinyl, N-ε-caprolactamyl, N-imidazolyl, 2-methylimidazol-1-yl, N-morpholinyl or 4-N-methylpiperazin-1-yl, particularly N-morpholinyl or N-pyrrolidonyl.

A group of preferred non-ionic substituents of the hydrophilic monomer comprises $C_1$-$C_2$-alkyl, which is unsubstituted or substituted by —OH or —NRR', wherein R and R' are each independently of the other hydrogen or $C_1$-$C_2$-alkyl; a radical —COOY wherein Y is $C_1$-$C_2$-alkyl; $C_2$-$C_4$-alkyl which is substituted by —OH, —NRR' wherein R and R' are each independently of another hydrogen or $C_1$-$C_2$-alkyl, or Y is a radical —$C_2$-$C_4$-alkylene-NH—C(O)—O-G wherein —O-G is the radical of a saccharide; a radical —C(O)—$NY_1Y_2$, wherein $Y_1$ and $Y_2$ are each independently of the other hydrogen, $C_1$-$C_2$-alkyl or $C_1$-$C_6$-alkyl which is unsubstituted or substituted by hydroxy or by a radical —$CH(OR_{18})$ wherein $R_{18}$ is hydrogen, $C_1$-$C_4$-alkyl, acetyl or propionyl, or $Y_1$ and $Y_2$ together with the adjacent N-atom form a heterocyclic 6-membered ring having no further heteroatom or having one further N- or O-atom; a radical —$OY_3$, wherein $Y_3$ is hydrogen, $C_1$-$C_2$-alkyl, $C_1$-$C_4$-alkyl which is substituted by —$NH_2$ or —$N(C_1$-$C_2$-alkyl$)_2$, or is a group —C(O)$C_1$-$C_2$-alkyl; or a 5- or 6-membered heteroaromatic or heteroaliphatic radical having one N-atom and in addition no further heteroatom or an additional N-, O- or S-heteroatom, or a 5 to 7-membered lactame.

A group of more preferred non-ionic substituents of the hydrophilic monomer comprises a radical —COOY, wherein Y is $C_1$-$C_2$-alkyl, $C_2$-$C_3$-alkyl, which is substituted by hydroxy, amino or N,N-di-$C_1$-$C_2$-alkylamino, or is a radical —$C_2$-$C_4$-alkylene-NH—C(O)—O-G wherein —O-G is the radical of trehalose or a cyclodextrin fragment with a maximum of 8 sugar units; a radical —CO—$NY_1Y_2$, wherein $Y_1$ and $Y_2$ are each independently of the other hydrogen, $C_1$-$C_2$-alkyl or $C_1$-$C_4$-alkyl which is substituted by hydroxy or a radical —$CH(OR_{18})_2$ wherein $R_{18}$ is hydrogen or $C_1$-$C_2$-alkyl, or $Y_1$ and $Y_2$ together with the adjacent N-atom form a N—$C_1$-$C_2$-alkyl-piperazino or morpholino ring; or a heterocyclic radical selected from the group consisting of N-pyrrolidonyl, 2- or 4-pyridinyl, 2-methylpyridin-5-yl, 2-, 3-oder 4-hydroxypyridinyl, N-ε-caprolactamyl, N-imidazolyl, 2-methylimidazol-1-yl, N-morpholinyl and 4-N-methylpiperazin-1-yl.

A particularly preferred group of non-ionic substituents of the hydrophilic monomer comprises the radicals —COO—$C_1$-$C_2$-alkyl, —COO—$(CH_2)_{2-4}$—OH, —$CONH_2$, —CON$(CH_3)_2$, —CONH—$(CH_2)_2$—OH, —CONH—$(CH_2)_{1-3}$—CH($OC_1$-$C_2$-alkyl),

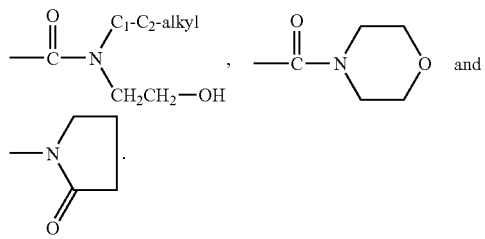

(ii) Anionic Substituents:

Preferred anionic substituents of the hydrophilic monomer are $C_1$-$C_4$-alkyl, in particular $C_1$-$C_2$-alkyl, which is substituted by one or more substituents selected from the group consisting of —$SO_3H$ and —$OPO_3H_2$, for example —$CH_2$—$SO_3H$; phenyl which is substituted by —$SO_3H$ or sulfomethyl, for example o-, m- or p-sulfophenyl or o-, m- or p-sulfomethylphenyl; —COOH; a radical —$COOY_4$, wherein $Y_4$ is $C_2$-$C_6$-alkyl which is substituted by —COOH, —$SO_3H$, —$OSO_3H$, —$OPO_3H_2$, or by a radical —NH—C(O)—O-G' wherein G' is the radical of lactobionic acid, hyaluronic acid or sialic acid, in particular $C_2$-$C_4$-alkyl which is substituted by —$SO_3H$ or —$OSO_3H$; a radical —$CONY_5Y_6$ wherein $Y_5$ is $C_1$-$C_6$-alkyl substituted by sulfo, in particular $C_2$-$C_4$-alkyl substituted by sulfo, and $Y_6$ is hydrogen, for example the radical —C(O)—NH—C$(CH_3)_2$—$CH_2$—$SO_3H$; or —$SO_3H$; or a suitable salt thereof. Particular preferred anionic substituents of B or B' are —COOH, —$SO_3H$, o-, m- or p-sulfophenyl, o-, m- or p-sulfomethylphenyl or a radical —$CONY_5Y_6$ wherein $Y_5$ is $C_2$-$C_4$-alkyl substituted by sulfo, and $Y_6$ is hydrogen.

(iii) Cationic Substituents:

Preferred cationic substituents of the hydrophilic monomer are $C_1$-$C_4$-alkyl, in particular $C_1$-$C_2$-alkyl, which is in each case substituted by —NRR'R"+An−; or a radical —C(O)$OY_7$ wherein $Y_7$ is $C_2$-$C_6$-alkyl, in particular $C_2$-$C_4$-alkyl, which is in each case substituted by —NRR'R"+An− and is further unsubstituted or substituted by hydroxy. R, R' and R" are each independently of another preferably hydrogen or $C_1$-$C_4$-alkyl, more preferably methyl or ethyl and particularly preferably methyl. Examples of suitable anions An− are Hal−, wherein Hal is halogen, for example Br−, F−, J− or particularly Cl−, furthermore $HCO_3^−$, $CO_3^{2−}$, $H_2PO_3^−$, $HPO_3^{2−}$, $PO_3^{3−}$, $HSO_4^−$, $SO_4^{2−}$ or the radical of an organic acid such as $OCOCH_3^−$ and the like. A particularly preferred cationic substituent of B or B' is a radical —C(O)$OY_7$ wherein $Y_7$ is $C_2$-$C_4$-alkyl, which is substituted by —N$(C_1$-$C_2$-alkyl$)_3^+$An− and is further substituted by hydroxy, and An− is an anion, for example the radical —C(O)O—$CH_2$—CH(OH)—$CH_2$—N$(CH_3)_3^+$An−.

(iv) Zwitterionic Substituents —$R_1$-Zw:

$R_1$ is a preferably a carbonyl, ester or amide functional group and more preferably an ester group —C(O)—O—.

Suitable anionic groups of the moiety Zw are for example —COO−, —$SO_3^−$, —$OSO_3^−$, —$OPO_3H^−$ or bivalent —O—$PO_2^−$— or —O—$PO_2^−$—O—, preferably a group —COO— or —$SO_3^−$ or a bivalent group —O—$PO_2^−$—, and in particular a group —$SO_3^−$.

Suitable cationic groups of the moiety Zw are for example a group —NRR'R"+ or a bivalent group —NRR"+—, wherein R, R' and R" are as defined above, and are each independently of the other, preferably hydrogen or $C_1$-$C_6$-alkyl, preferably hydrogen or $C_1$-$C_4$-alkyl and most preferably each methyl or ethyl.

The moiety Zw is for example $C_2$-$C_{30}$-alkyl, preferably $C_2$-$C_{12}$-alkyl, and more preferably $C_3$-$C_8$-alkyl, which is in each case uninterrupted or interrupted by —O— and substituted or interrupted by one of the above-mentioned anionic and cationic groups each, and, in addition, is further unsubstituted or substituted by a radical —$OY_8$, wherein $Y_8$ is hydrogen or the acyl radical of a carboxylic acid.

$Y_8$ is preferably hydrogen or the acyl radical of a higher fatty acid.

Zw is preferably $C_2$-$C_{12}$-alkyl and even more preferably $C_3$-$C_8$-alkyl which is substituted or interrupted by one of the above-mentioned anionic and cationic groups each, and in addition may be further substituted by a radical —$OY_8$.

A preferred group of zwitter-ionic substituents —$R_1$-Zw corresponds to the formula

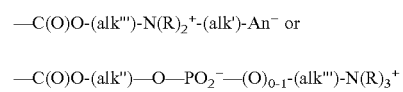

wherein R is hydrogen or $C_1$-$C_6$-alkyl; An− is an anionic group —COO−, —$SO_3^−$, —$OSO_3^−$ or —$OPO_3H^−$, preferably —COO− or —$SO_3^−$ and most preferably —$SO_3^−$, alk' is $C_1$-$C_{12}$-alkylene, (alk") is $C_2$-$C_{24}$-alkylene which is unsubstituted or substituted by a radical —$OY_8$, $Y_8$ is hydrogen or the acyl radical of a carboxylic acid, and (alk'") is $C_2$-$C_8$-alkylene.

(alk') is preferably $C_2$-$C_8$-alkylene, more preferably $C_2$-$C_6$-alkylene and most preferably $C_2$-$C_4$-alkylene. (alk") is preferably $C_2$-$C_{12}$-alkylene, more preferably $C_2$-$C_6$-alkylene and particularly preferably $C_2$-$C_3$-alkylene which is in each case unsubstituted or substituted by hydroxy or by a radical —$OY_8$. (alk'") is preferably $C_2$-$C_4$-alkylene and more preferably $C_2$-$C_3$-alkylene. $R_9$ is hydrogen or $C_1$-$C_4$-alkyl, more preferably methyl or ethyl and particularly preferably methyl. A preferred zwitterionic substituent is of formula

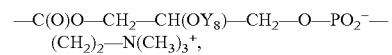

wherein $Y_8$ is hydrogen or the acyl radical of a higher fatty acid.

The hydrophilic monomer according to step a) is, for example, a radical of formula

(1a)

-continued

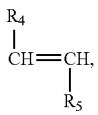
(1b)

wherein $R_2$ is hydrogen or $C_1$-$C_4$-alkyl, preferably hydrogen or methyl; $R_3$ is a hydrophilic substituent, wherein the above given meanings and preferences apply; $R_4$ is $C_1$-$C_4$-alkyl, phenyl or a radical —C(O)OY$_9$, wherein $Y_9$ is hydrogen or unsubstituted or hydroxy-substituted $C_1$-$C_4$-alkyl; and $R_5$ is a radical —C(O)Y$_9$' or —CH$_2$—C(O)OY$_9$' wherein $Y_9$' independently has the meaning of $Y_9$.

$R_4$ is preferably $C_1$-$C_2$-alkyl, phenyl or a group —C(O)OY$_9$. $R_5$ is preferably a group —C(O)OY$_9$' or —CH$_2$—C(O)OY$_9$' wherein $Y_9$ and $Y_9$' are each independently of the other hydrogen, $C_1$-$C_2$-alkyl or hydroxy-$C_1$-$C_2$-alkyl. Particularly preferred —CHR$_4$—CHR$_5$— units according to the invention are those wherein $R_4$ is methyl or a group —C(O)OY$_9$ and $R_5$ is a group —C(O)OY$_9$' or —CH$_2$—C(O)OY$_9$' wherein $Y_9$ and $Y_9$' are each hydrogen, $C_1$-$C_2$-alkyl or hydroxy-$C_1$-$C_2$-alkyl.

The hydrophilic monomer according to step a) is preferably a radical of formula (1a) above, wherein the above-given meanings and preferences apply to the variables contained therein. A particular preferred hydrophilic monomer is of formula (1a) above wherein $R_2$ is hydrogen or methyl and $R_3$ is —COO—$C_1$-$C_2$-alkyl, —COO—(CH$_2$)$_{2-4}$—OH, —CONH$_2$, —CON(CH$_3$)$_2$, —CONH—(CH$_2$)$_2$—OH, —CONH—(CH$_2$)$_{1-3}$—CH(OC$_1$-$C_2$-alkyl),

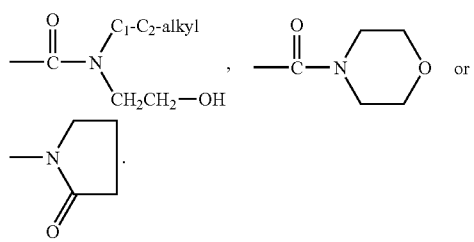

The polymerization mixture according to step (a) may contain one or more than one of the above mentioned hydrophilic monomers, preferably one monomer only.

A further group of suitable hydrophilic monomers in step (a) concerns hydrophilic telomers as disclosed in PCT application WO 99/57581, formula (1) on page 2, wherein the definitions and preferences given therein for the variables apply in each case. A further embodiment of the invention concerns using in step (a) a mixture of one or more monomers of the formula (1a) or (1b) above and a telomer of formula (1) of PCT application WO 99/57581.

The choice of crosslinker employed in step (a) may vary within wide limits and is strongly dependent upon the intended use.

One group of suitable crosslinkers are low molecular weight di- or polyvinylic crosslinking agents, for example crosslinking agents having 2 to 4, preferably 2 or 3 and in particular 2 ethylenically unsaturated double bonds and having a weight-average molecular weight of, for example, <500. Examples are an ethylenglycol diacrylate or dimethacrylate, di-, tri- or tetraethylenglycol diacrylate or dimethacrylate, allyl (meth)acrylate, a $C_2$-$C_{12}$-alkylene diacrylate or dimethacrylate, a partly or completely fluorinated $C_2$-$C_{12}$-alkylene diacrylate or dimethacrylate, divinyl ether, divinyl sulfone, di- and trivinylbenzene, trimethylolpropane triacrylate or trimethacrylate, pentaerythritol tetraacrylate or tetramethacrylate, bisphenol A diacrylate or dimethacrylate, methylene bisacrylamide or -bismethacrylamide, ethylene bisacrylamide or ethylene bismethacrylamide, N,N'-(1,2-dihydroxyethylene)-bisacrylamide, triallyl phthalate or diallyl phthalate. Preferred crosslinkers according to this embodiment of the invention are ethyleneglycol-dimethacrylate, pentaerythritoltetraacrylate or pentaerythritoltetramethacrylate.

A further group of suitable crosslinkers comprises polysiloxanes, perfluoroalkyl polyethers or polysiloxane/perfluoroalkyl polyether block copolymers comprising in each case two or more, for example 2 to 8, preferably 2 to 4 and most preferably 2 to 3, ethylenically unsaturated double bonds.

A suitable polysiloxane crosslinker may be any polysiloxane comprising —O—Si(R$_6$R$_7$)-silicone repeat units and two or more, preferably from 2 to 8, more preferably from 2 to 4 and in particular 2, ethylenically unsaturated moieties bound terminally or pendently to silicon atoms by means of a suitable bridge member, wherein $R_6$ and $R_7$ are as defined below. The weight-average molecular weight of the polysiloxane crosslinker is, for example, from 500 to 50000, preferably from 1000 to 25000, more preferably from 2500 to 15000 and in particular from 3000 to 12000.

A preferred polysiloxane crosslinker is, for example, of formula

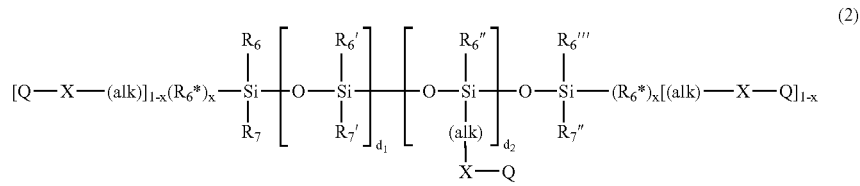
(2)

in which (alk) is alkylene having up to 20 carbon atoms which may be interrupted by —O—; X is —O— or —NR$_8$—, $R_8$ is hydrogen or $C_1$-$C_6$-alkyl, Q is an organic radical comprising a crosslinkable or polymerizable group, 80-100% of the radicals $R_6$, $R_6$', $R_6$", $R_6$''', $R_6$*, $R_7$, $R_7$' and $R_7$", independently of one another, are $C_1$-$C_8$-alkyl and 0-20% of the radicals $R_6$, $R_6$', $R_6$", $R_6$''', $R_6$*, $R_7$, $R_7$' and $R_7$", independently of one another, are unsubstituted or $C_1$-$C_4$ alkyl- or $C_1$-$C_4$—alkoxy-substituted phenyl, fluoro ($C_1$-$C_{12}$-alkyl), cyano($C_1$-$C_{12}$-alkyl), hydroxy-$C_1$-$C_6$-alkyl or amino-$C_1$-$C_6$-alkyl, x is the number 0 or 1, $d_1$ is an integer of from 5 to 700, $d_2$ is an integer from 0 to 8 if x is 0, and is 2 to 10 if x is 1, and the sum of ($d_1$+$d_2$) is from 5 to 700.

In a preferred meaning, the sum of ($d_1$+$d_2$) is an integer from 10 to 500, more preferably 10 to 300, particularly preferably 20 to 200 and in particular 20 to 100. Preferably, $d_2$ and x are each 0. According to another preferred embodiment, x is 0 and $d_2$ is an integer from 1 to 4. According to still another preferred embodiment, x is 1 and $d_2$ is an integer from 2 to 4.

Preferably 90 to 100% of the radicals $R_6$, $R_6'$, $R_6''$, $R_6'''$, $R_6^*$, $R_7$, $R_7'$ and $R_7''$ are $C_1$-$C_4$-alkyl, in particular methyl, and 0 to 10% of the radicals $R_6$, $R_6'$, $R_6''$, $R_6'''$, $R_6^*$, $R_7$, $R_7'$ and $R_7''$ are each independently amino-$C_1$-$C_4$-alkyl or hydroxy-$C_1$-$C_4$-alkyl.

A preferred embodiment of suitable polysiloxane crosslinkers emcompasses a radical of the above formula (2), wherein x is 0, $d_2$ is 0, $d_1$ is an integer from 5 to 700, preferably 10 to 500, more preferably 10 to 300, even more preferably 20 to 200 and in particular preferably 20 to 100, $R_6$, $R_6'$, $R_6'''$, $R_7$, $R_7'$ and $R_7''$ are each independently of the another $C_1$-$C_4$-alkyl, in particular methyl, and for (alk), X and Q the above and below given meanings and preferences apply.

(alk) is preferably $C_2$-$C_8$-alkylene, which may be interrupted by —O— and more preferably $C_2$-$C_6$-alkylene which may be interrupted by —O—. Examples of particular preferred radicals (alk) are linear or branched $C_2$-$C_6$ alkylene or a radical —(CH$_2$)$_{1-3}$—O—(CH$_2$)$_{1-3}$—, especially $C_2$-$C_4$-alkylene such as 1,2-ethylene, 1,3-propylene or 1,4-butylene, or a radical —(CH$_2$)$_{2-3}$—O—(CH$_2$)$_{2-3}$—, in particular —(CH$_2$)$_2$—O—(CH$_2$)$_2$— or —(CH$_2$)$_2$—O—(CH$_2$)$_3$—.

$R_8$ is preferably hydrogen or $C_1$-$C_4$-alkyl, and particularly hydrogen or $C_1$-$C_2$-alkyl. X is preferably —O—, —NH— or —N($C_1$-$C_2$-alkyl)-, in particular —O— or especially —NH—.

Q is, for example, a radical of formula

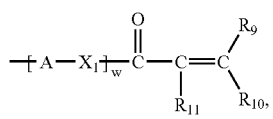

(3)

wherein $R_{11}$ is hydrogen or $C_1$-$C_4$-alkyl, $R_9$ and $R_{10}$ are each independently of the other hydrogen, $C_1$-$C_4$-alkyl, phenyl, carboxy or halogen, $X_1$ is —O— or —NH—, w is the number 0 or 1, and A is a bivalent radical

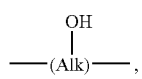

(4a)

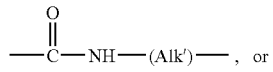

(4b)

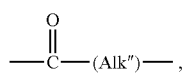

(4c)

wherein (Alk) is linear or branched $C_3$-$C_6$-alkylene, (Alk') is linear or branched $C_2$-$C_{12}$-alkylene, and (Alk'') is linear or branched $C_1$-$C_6$-alkylene.

$R_{11}$ is preferably hydrogen or methyl. Each of $R_9$ and $R_{10}$ independently of the other is preferably hydrogen, carboxy, chlorine, methyl or phenyl. In a preferred embodiment of the invention, $R_9$ is hydrogen or methyl and $R_{10}$ is hydrogen or carboxy. Most preferably, $R_9$ and $R_{10}$ are each hydrogen. The radical -[(Alk)-OH]— in formula (4a) is preferably 2-hydroxy-1,3-propylene. (Alk') is preferably $C_2$-$C_6$-alkylene, more preferably $C_2$-$C_4$-alkylene and in particular ethylene. (Alk'') is preferably $C_1$-$C_3$-alkylene, for example methylene or in particular 1,1-dimethylmethylene.

Especially preferred radicals -Q correspond to formula

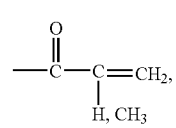

(3a)

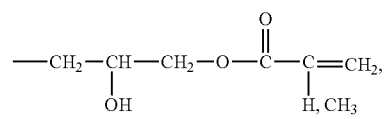

(4a')

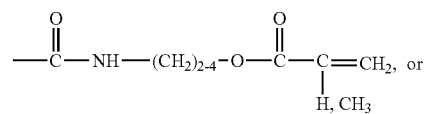

(4b')

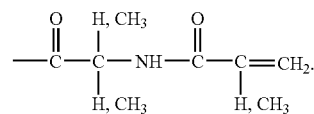

(4c')

A preferred polysiloxane crosslinker corresponds to formula

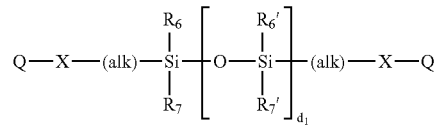

(2a)

wherein $R_6$, $R_6'$, $R_7$ and $R_7'$ are each $C_1$-$C_4$-alkyl, in particular methyl, $d_1$ is an integer from 10 to 500, preferably 10 to 300, more preferably 20 to 200 and in particular 25 to 150, (alk) is linear or branched $C_2$-$C_6$ alkylene or a radical —(CH$_2$)$_{1-3}$—O—(CH$_2$)$_{1-3}$—, X is —O— or in particular —NH— and Q is a radical of the above formula (3a), (4a'), (4b') or (4c'), in particular (3a) or (4b').

A suitable perfluoroalkyl polyether crosslinker is, for example, a macromer of formula

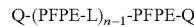

Q-(PFPE-L)$_{n-1}$-PFPE-Q  (5), wherein n is ≥1, each PFPE may be the same or different and is a perfluorinated polyether of formula

—OCH$_2$CF$_2$O(CF$_2$CF$_2$O)$_z$(CF$_2$O)$_y$CF$_2$CH$_2$O—  (6)

wherein the CF$_2$CF$_2$O and CF$_2$O units may be randomly distributed or distributed as blocks throughout the chain and wherein z and y may be the same or different such that the weight average molecular weight of the perfluoropolyether is in the range of from 500 to 4,000 and preferably from 500 to 2500;

L is a difunctional linking group; and

Q is as defined above.

Preferably n is an integer from 1 to 4, and in particular of 1.

The linking group L may be any difunctional moiety able to react with hydroxyl. Suitable precursors to L are α,ω-epoxides, α,ω-diisocyanates, α,ω-diisothiocyanates, α,ω-diacylhalides, α,ω-dithioacylhalides, α,β or α,ω-dicarboxylic acids, α,ω-adithiocarboxylic acids, α,ω-dianhydrides, α,ω-dilactones, α,ω-dialkylesters, α,ω-dihalides, α,ω-dialkylethers, α,ω-dihydroxymethylamides. It is preferred that the linking group be a bivalent residue —C(O)—NH—$R_{12}$—NH—C(O)— of a diisocyanate wherein $R_{12}$ is a divalent organic radical having from 1 to 20 carbon atoms. According to a further embodiment the linking group is a divalent radical of a carboxylic acid, for example oxalyl.

The divalent radical $R_{12}$ is, for example, alkylene, arylene, alkylenearylene, arylenealkylene or arylenealkylenearylene having 1 to 20 carbon atoms, a saturated bivalent cycloaliphatic group having 6 to 20 carbon atoms or cycloalkylenealkylenecycloalkylene having 7 to 20 carbon atoms.

In a preferred embodiment, $R_{12}$ is alkylene, arylene, alkylenearylene, arylenealkylene or arylenealkylenearylene having up to 14 carbon atoms or a saturated bivalent cycloaliphatic group having 6 to 14 carbon atoms. In a particularly preferred embodiment, $R_{12}$ is alkylene or arylene having up to 12 carbon atoms or a saturated bivalent cycloaliphatic group having 6 to 14 carbon atoms.

In a preferred embodiment, $R_{12}$ is alkylene or arylene having up to 10 carbon atoms or a saturated bivalent cycloaliphatic group having 6 to 10 carbon atoms.

In a particularly preferred meaning, $R_{12}$ is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by $C_1$-$C_4$-alkyl or $C_1$-$C_4$-alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene ($C_1$-$C_4$-alkylene), for example cyclohexylenemethylene, which is unsubstituted or substituted by one or more $C_1$-$C_4$-alkyl groups, for example methyl groups, for example trimethylcyclohexylenemethylene, for example the bivalent isophorone radical.

Alkylene has 1 to 12 carbon atoms and can be straight-chain or branched. Suitable examples are decylene, octylene, hexylene, pentylene, butylene, propylene, ethylene, methylene, 2-propylene, 2-butylene, 3-pentylene, and the like. Particularly preferred meanings of alkylene are propylene, ethylene and methylene.

The arylene unit in alkylenearylene or arylenealkylene is preferably phenylene, unsubstituted or substituted by $C_1$-$C_4$-alkyl or $C_1$-$C_4$-alkoxy, and the alkylene unit therein is preferably $C_1$-$C_4$-alkylene, such as methylene or ethylene, in particular methylene. These radicals are therefore preferably phenylenemethylene or methylenephenylene.

Arylenealkylenearylene is preferably phenylene($C_1$-$C_4$-alkylene)phenylene, for example phenyleneethylenephenylene or phenylenemethylenephenylene.

Some examples of preferred diisocyanates are those wherein $R_{12}$ is linear or branched $C_6$-$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl.

The bivalent radical $R_{12}$ is derived preferably from a diisocyanate and most preferably from a diisocyanate selected from the group isophorone diisocyanate (IPDI), toluylene-2,4-diisocyanate (TDI), 4,4'-methylenebis(cyclohexyl isocyanate), 1,6-diisocyanato-2,2,4-trimethyl-n-hexane (TMDI), methylenebis(phenyl isocyanate) (MDI), methylenebis-(cyclohexyl-4-isocyanate) and hexamethylene diisocyanate (HMDI).

Preferably, z in formula (6) is in the range of from 0 to 20, more preferably from 2 to 16, and in particular from 4 to 12 and y is in the range from 0 to 25, more preferably from 4 to 20 and in particular from 6 to 14. Preferably, z and y may be the same or different such that the weight average molecular weight of the perfluoroalkyl polyether is in the range of from 500 to 2,500 and most preferably in the range of from 1000 to 2200.

A preferred crosslinker of the polymerizable component according to (a) is a macromonomer of the formula

Q-PFPE-Q (5a), wherein

PFPE is a radical of the above formula (6) wherein z and y may be the same or different such that the molecular weight of the perfluoroalkyl polyether is in the range of from 500 to 2,500; and Q is the radical —C(O)NH—(CH$_2$)$_2$—OC(O)—C(CH$_3$)=CH$_2$, the methacryloyl radical —C(O)—C(CH$_3$)=CH$_2$ or preferably the acryloyl radical —C(O)—CH=CH$_2$.

Examples of preferred PFPE crosslinkers are:

(i) CH$_2$=C(CH$_3$)C(O)OC$_2$H$_4$NHC(O)—(PFPE-(O)CNH—$R_{12}$—NHC(O)—)$_{n-1}$-PFPE-C(O)NHC$_2$H$_4$O—C(O)C(CH$_3$)=CH$_2$,CH=C(CH$_3$)C(O)OC$_2$H$_4$NHC(O)-PFPE-(O)CNH—$R_{12}$—NHC(O)-PFPE-H, (ii) CH$_2$=C(CH$_3$)C(O)OC$_2$H$_4$NHC(O)-PFPE-(O)CNH—C$_2$H$_4$OC(O)C(CH$_3$)=CH$_2$, (iii) CH$_2$=C(CH$_3$)C(O)-PFPE-(O)CC(CH$_3$)=CH$_2$ wherein PFPE is a perfluorinated polyether of formula (6), wherein z is in the range of from 8 to 10 and y is in the range of from 10 to 14, n>1.0, and $R_{12}$ is the radical of a diisocyanate, wherein the above-given meanings and preferences apply.

A suitable polysiloxane/perfluoroalkyl polyether block copolymer crosslinker is, for example, of formula

Q-PFPE-L-M-L-PFPE-Q (7), wherein for PFPE, L and Q each the above given meanings and preferences apply and M is a radical of formula

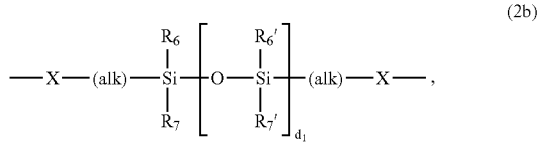

(2b)

wherein for each of $R_6$, $R_6'$, $R_7$, $R_7'$, (alk), X and di the above given meanings and preferences apply. The weight average molecular weight of the segment of formula (2b) is preferably in the range of from 180 to 6000.

An example of a polysiloxane/perfluoroalkyl polyether block copolymer crosslinker is $CH_2=C(CH_3)-COO-C_2H_4-NHCO-PFPE-CONH-R_{12}-NHCO-OCH_2CH_2CH_2-Si(CH_3)_2-(OSi(CH_3)_2)_{11}-CH_2CH_2CH_2O-CONH-R_{12}-NHCO-PFPE-CONH-C_2H_4-OCO-C(CH_3)=CH_2$, wherein PFPE is a perfluorinated polyether of formula (6), wherein z is in the range of from 8 to 10 and y is in the range of from 10 to 14, and $R_{12}$ is the radical of a diisocyanate, wherein the above-given meanings and preferences apply.

A further group of polysiloxane crosslinkers are those of formula

Q-(PDMS)$_1$-L-(PDMS)$_2$-Q (2c), wherein (PDMS)$_1$ and (PDMS)$_2$ are each independently a radical of formula (2b) above, and Q and L are each as defined above.

A further group of suitable crosslinkers are hydrophilic polymers, for example a polalkylene glycol, polyvinyl alcohol, polyacrylic or polymethacrylic acid, oligosaccharide, polypeptide, polyhydroxyalkylacrylate or -methacrylate, or poly(hydroxycarboxylic acid) comprising in each case two or more ethylenically unsaturated groups.

A suitable polyalkylene glycol crosslinker is for example a polyethylene glycol, polypropylene glycol or a polyethylene/polypropylene glycol block copolymer having two ethylenically unsaturated groups.

The polyalkylene glycol crosslinker conforms, for example, to formula

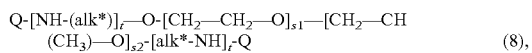

Q-[NH-(alk*)]$_t$—O-[CH$_2$—CH$_2$—O]$_{s1}$—[CH$_2$—CH(CH$_3$)—O]$_{s2}$-[alk*-NH]$_t$-Q (8), wherein (alk*) is linear or branched $C_2$-$C_8$-alkylene, t is the number 0 or 1, s1 and s2 are each independently an integer from 5 to 275 wherein the total of (s1+s2) is from 5 to 275, and for Q the above-given meanings and preferences apply.

In the above formula (8), (alk*) is preferably $C_2$-$C_4$-alkylene and in particular $C_2$-$C_3$-alkylene. s2 is preferably the number 0. s1 is preferably an integer from 5 to 100, more preferably 8 to 60 and in particular 9 to 25 Q is preferably a radical of the above-given formula (3a) or (4b'). One preferred group of polyalkylene glycol crosslinkers conforms to the above formula (8), wherein t is 1, (alk*) is $C_2$-$C_4$-alkylene, s1 is an integer from 5 to 100, s2 is 0, and for Q the above-given meanings and preferences apply. Another preferred group of polyalkylene glycol crosslinkers conforms to the above formula (8), wherein t is 0, s1 is an integer from 5 to 100, s2 is 0, and for Q the above-given meanings and preferences apply.

A suitable polyvinyl alcohol (PVA), polyacrylic acid, polymethacrylic acid, polyallylamine, polysaccharide, polypeptide, polyhydroxyalkylacrylate, polyhydroxyalkylmethacrylate or poly(hydroxycarboxylic acid) crosslinker is, for example, a respective polymer having a weight average molecular weight of, for example, from 250 to 100000, wherein on the average in at least two monomer units the hydroxy, amino or carboxy groups are substituted by a crosslinkable ethylenically unsaturated moiety, for example by a radical —O-Q or —NH-Q, —C(O)NH-(alk')-OC(O)—C(H, CH$_3$)=CH$_2$, —C(O)O-(alk[OH])—OC(O)—C(H, CH$_3$)=CH$_2$ or

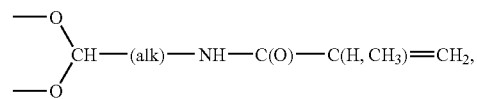

wherein for Q, (alk) and (alk') each the above given meanings and preferences apply. For example, suitable PVA crosslinkers are disclosed in EP-A-641806 or may be derived therefrom by a fragmentation reaction, for example by a periodate treatment. The weight average molecular weight of said hydrophilic crosslinkers is preferably from 350 to 75000, more preferably from 500 to 50000 and in particular from 500 to 15000. In addition, preferably from 2 to 10, more preferably from 2 to 6, and even more preferably from 2 to 4 of the monomer units are substituted by a crosslinkable ethylenically unsaturated moiety. Moreover, the hydrophilic crosslinkers mentioned above may also comprise small proportions, for example up to 20%, preferably up to 5%, of hydrophilic or hydrophobic copolymer units. A suitable oligosaccharide crosslinker is, for example, an oligosaccharide having from 2 to 12 sugar units wherein on the average at least two hydroxy groups are substituted by one of the afore-mentioned crosslinkable moieties. A suitable poly(hydroxycarboxylic acid) crosslinker is, for example, a poly(glycolic acid, poly(2-hydroxy butyric acid) or polylactide wherein the terminating hydroxy and carboxy group are in each case substituted by an afore-mentioned crosslinkable ethylenically unsaturated moiety.

The functional chain transfer agent used in step (a) controls the molecular weight of the resulting prepolymer and provides functionality for subsequent addition of a polymerizable or crosslinkable group. The chain transfer agent may comprise one or more thiol groups, for example two or most preferably one thiol group. Suitable chain transfer agents include organic primary thiols or mercaptans having a further functional group such as, for example, hydroxy, amino, N—$C_1$-$C_6$-alkylamino, carboxy or a suitable derivative thereof. A preferred chain transfer agent is a cycloaliphatic or preferably aliphatic thiol having from 2 to about 24 carbon atoms and having a further functional group selected from amino, hydroxy and carboxy; accordingly, the preferred chain transfer agents are aliphatic mercapto carboxylic acids, hydroxymercaptans or aminomercaptans. Examples of particularly preferred chain transfer agents are thioglycolic acid, 2-mercaptoethanol and especially 2-aminoethane thiol (cysteamine). In case of an amine or a carboxylic acid, the chain transfer agent may be in form of the free amine or acid or, preferably, in form of a suitable salt thereof, for example a hydrochloride in case of an amine or a sodium, potassium or amine salt in case of an acid. An example for a chain transfer agent having more than one thiol group is the reaction product of one equivalent of diethylene triamine with about two equivalents of γ-thiobutyrolactone.

The stoichiometry of the hydrophilic monomer, crosslinker and chain transfer agent in step (a) may be chosen within wide limits and is strongly dependant on the intended use. For example, a molar ratio of from 0.5 to 5 equivalents chain transfer agent: 1 equivalent crosslinker: 5 to 60 equivalents hydrophilic monomer(s) has proven as practicable for biomedical purposes. A preferred range is from 1 to 3 molar equivalents chain transfer agent: 1 molar equivalent crosslinker: 10 to 50 molar equivalents hydrophilic monomer(s). A more preferred range is from 1 to 3 molar equivalents chain transfer agent: 1 molar equivalent crosslinker: 12 to 40 molar equivalents hydrophilic monomer(s).

The copolymerization step (a) may be carried out in the presence of a solvent. The solvent choice is dependent on the monomers and crosslinkers used. Preferred solvents include $C_1$-$C_4$-alcohols such as methanol, ethanol or n- or isopropanol; cyclic ether such as tetrahydrofurane or dioxane; ketones such as methyl ethyl ketone; optionally halogenated hydrocarbons such as toluene, chloroform or dichloromethane; and mixtures of these solvents. Preferred solvents are ethanol, THF, n- or isopropanol or a mixture of ethanol and THF. The contents of polymerizable components within the solution may vary within wide limits. Advantageously the the total of polymerizable components within the solution is in the range of ≦30% by weight, preferably ≦25% by weight and most preferably from 10 to 20% by weight, based in each case on the total weight of the solution.

The copolymerization of the hydrophilic monomer(s) and crosslinker in step (a) may be induced photochemically or preferably thermally. Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis (1-cyclohexanecarbonitrile), 2,2'-azo-bis(2,4-dimethylvaleronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere. Surprisingly, the telomerization reaction in the presence of a crosslinker does not produce a jellied uncontrollable reaction mixture as expected by the artisan but yields optical clear well-defined copolymers which may be worked up in conventional manner using for example extraction, precipitation, ultrafiltration and the like techniques.

The weight average molecular weight of the resulting copolymers is strongly dependent, for example, on the amount of chain transfer agent used. A weight average molecular weight of, for example, from 500 to 200000, preferably from 750 to 100000, more preferably from 750 to 50000, and in particular from 1000 to 25000 has proven as valuable.

The organic compound having an ethylenically unsaturated double bond according to step (b) is, for example, an ethylenically unsaturated compound having from 2 to 18 C-atoms which is substituted by a reactive group that is co-reactive to the functional group of the chain transfer agent. Examples of such co-reactive groups are a carboxy, carboxylic acid ester, carboxylic acid anhydride, epoxy, lactone, azlactone or isocyanato group, if the functional group of the chain transfer agent is, for example, an amino or hydroxy group; or are amino, hydroxy, if the functional group of the chain transfer agent is, for example, carboxy or the like.

One group of preferred reactive groups comprises carboxy, carboxylic acid anhydride, aziactone or isocyanato, in particular isocyanato. A suitable organic compound having such reactive group and an ethylenically unsaturated double bond is, for example, of formula

(9a)

(9b)

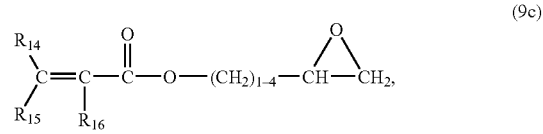
(9c)

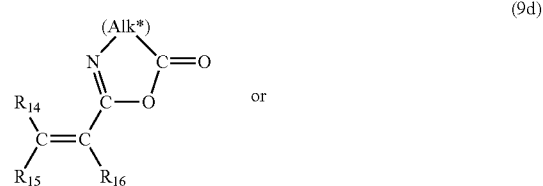
(9d)

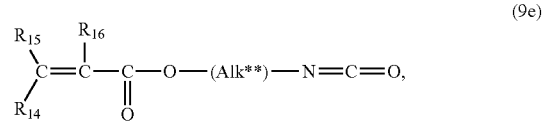
(9e)

wherein $R_{13}$ is halogen, hydroxy, unsubstituted or hydroxy-substituted $C_1$-$C_6$-alkoxy or phenoxy, $R_{14}$, and $R_{15}$ are each independently of the other hydrogen, $C_0$-$C_4$-alkyl, phenyl, carboxy or halogen, $R_{16}$ is hydrogen, $C_1$-$C_4$-alkyl or halogen, $R_{17}$ and $R_{17}'$ are each an ethylenically unsaturated radical having from 2 to 6 C-atoms, or $R_{17}$ and $R_{17}'$ together form a bivalent radical —C($R_{14}$)=C($R_{16}$)— wherein $R_{14}$ and $R_{16}$ are as defined above, and (Alk*) is $C_1$-$C_6$-alkylene, and (Alk**) is $C_2$-$C_{12}$-alkylene.

The following preferences apply to the variables contained in formulae (9a)-(9e):

$R_{13}$ is preferably halogen such as chlorine; hydroxy; or hydroxy-$C_1$-$C_4$-alkoxy, such as 2-hydroxyethyl; in particular chlorine.

One of the variables $R_{14}$ and $R_{15}$ is preferably hydrogen and the other one is hydrogen, methyl or carboxy. Most preferably $R_{14}$ and $R_{15}$ are each hydrogen.

$R_{16}$ is preferably hydrogen or methyl.

$R_{17}$ and $R_{17}'$ are preferably each vinyl or 1-methylvinyl, or $R_{17}$ and $R_{17}'$ together form a radical —C($R_{14}$)=C($R_{16}$)— wherein $R_{14}$ and $R_{16}$ are each independently hydrogen or methyl.

(Alk*) is preferably methylene, ethylene or 1,1-dimethyl-methylene, in particular a radical —CH$_2$— or —C(CH$_3$)$_2$—.

(Alk**) is preferably C$_2$-C$_4$-alkylene and in particular 1,2-ethylene.

Particularly preferred organic compounds having an ethylenically unsaturated double bond that are co-reactive to an amino or hydroxy group of the chain transfer agent are 2-isocyanatoethylmethacrylate (IEM), 2-vinyl-azlactone, 2-vinyl-4,4-dimethyl-azlactone, acrylic acid or a derivative thereof, for example acryloyl chloride or acrylic acid anhydride, methacrylic acid or a derivative thereof, for example methacryloyl chloride or methacrylic acid anhydride, maleic acid anhydride, 2-hydroxyethylacrylate (HEA), 2-hydroxymethacrylate (HEMA), glycidylacrylate or glycidylmethacrylat.

The reactions of a compound of formula (9a)-(9e) having a carboxylic acid halide group, carboxylic acid anhydride group, epoxy group, azlactone group or isocyanato group with an amino or hydroxy group of the copolymer formed in step (a) are well-known in the art and may be carried out as described in textbooks of organic chemistry. In general, the copolymer according to step (a) is reacted with stoichiometric amounts or preferably with an excess of the components of formula (9a)-(9e).

For example, the reaction of the carboxylic acid halide of formula (9a) with a hydroxy- or amino-group of the copolymer of step (a) can be carried out under the conditions that are customary for ester or amide formation, for example at temperatures of, for example, from −40 to 80° C., preferably from 0 to 50° C. and most preferably from 0 to 25° C., in a dipolar aprotic solvent, e.g. tetrahydrofuran, dioxane, DMSO or an C$_1$-C$_4$-alcanol, or in a mixture of water and one or more of the mentioned solvents, in the presence of a base, e.g. an alkali metal hydroxide, and, where applicable, in the presence of a buffer component such as hydrogen carbonate or a stabiliser. Suitable stabilisers are, for example, 2,6-dialkylphenols, hydroquinone derivatives, e.g. hydroquinone or hydroquinone monoalkyl ethers, or N-oxides, e.g. 4-hydroxy-2,2,6,6-tetramethyl-piperidin-1-yl. The reaction times may vary within wide limits, a period of, for example, from 5 minutes to 12 hours, preferably from 15 minutes to 6 hours and especially from 20 minutes to 3 hours, generally having been found practicable.

The reaction of a carboxylic acid anhydride or epoxide of formula (9b) or (9c) with a hydroxy- or amino-group of the copolymer of step (a) may be carried out as described in organic textbooks, for example in an acidic or in a basic medium.

The reaction of an azlactone of formula (9d) with a hydroxy- or amino-group of the polymer according to step (a) may be carried out at elevated temperature, for example at about 50 to 75° C., in a suitable organic solvent, for example an aprotic polar solvent such as DMF, DMSO, dioxane and the like, optionally in the presence of a catalyst, for example in the presence of a tertiary amine such as triethyl amine or an organotin salt such as dibutyltin dilaurate, or in particular in the presence of 1,8-diazabicyclo[5.4.0]undec-7-ene (DBU).

The reaction of a compound of formula (9e) with a hydroxy- or amino-group of the polymer according to step (a) can be carried out under the conditions that are customary for the formation of urethanes or ureas. In case of urethane formation it is advantageously to perform the reaction in an inert solvent. Amino-copolymers of step (a) may be reacted with the isocyanate of formula (9e) also in an aqueous medium.

Suitable inert solvents for the reaction of a copolymer of step (a) with a compound of formula (9e) are aprotic, preferably polar, solvents, for example hydrocarbons (petroleum ether, methylcyclohexane, benzene, toluene, xylene), halogenated hydrocarbons (chloroform, methylene chloride, trichloroethane, tetrachloroethane, chlorobenzene), ethers (diethyl ether, dibutyl ether, ethylene glycol dimethyl ether, diethylene glycol dimethyl ether, tetrahydrofuran, dioxane), ketones (acetone, dibutyl ketone, methyl ethyl ketone, methyl isobutyl ketone), carboxylic acid esters and lactones (ethyl acetate, butyrolactone, valerolactone), alkylated carboxylic acid amides (N,N-dimethylacetamide, N-methylpyrrolidone), nitriles (acetonitrile), sulfones and sulfoxides (dimethyl sulfoxide, tetra-methylenesulfone). Polar solvents are preferably used. The reaction temperature may be, for example, from −40 to 200° C. When catalysts are used, the temperatures may advantageously be in the range of from 0 to 50° C., preferably at room temperature. Suitable catalysts are, for example, metal salts, such as ferric chloride or alkali metal salts of carboxylic acids, tertiary amines, for example (C$_1$-C$_6$alkyl)$_3$N (triethylamine, tri-n-butylamine), N-methylpyrrolidine, N-methylmorpholine, N,N-dimethylpiperidine, pyridine and 1,4-diazabicyclooctane. Tin salts have been found to be especially effective, especially alkyltin salts of carboxylic acids, for example dibutyltin dilaurate and tin dioctoate. The isolation and purification of the compounds prepared is carried out according to known methods, for example by means of extraction, crystallisation, recrystallisation or chromatographic purification methods.

The compounds of the formula (9a), (9b), (9c), (9d) and (9e) are known compounds which are commercially available or may be prepared according to known methods.

Another group of suitable organic compounds having an ethylenically unsaturated double bond in step (b) are those having an amino, hydroxy or epoxy group that is coreactive to the carboxy group or a derivative thereof of the ccopolymer of step (a). Examples are allyl amine, allyl alcohol, 2-hydroethyl acrylate and methacrylate or preferably a compound of formula (9c) above, for example glycidyl acrylate or methacrylate The reaction may be carried out as described above for ester or amide formation.

Throughout the application terms such as carboxy, carboxylic acid, —COOH, sulfo, —SO$_3$H, amino, —NH$_2$ and the like always include the free acid or amine as well as a suitable salt thereof, for example a biomedically or in particular occularly acceptable salt thereof such as, for example, a sodium, potassium, ammonium salt or the like (of an acid), or a hydrohalide such a hydrochloride (of an amine).

The copolymers obtainable according to the invention are prepolymers and are therefore crosslinkable, but uncrosslinked or, at least, substantially uncrosslinked; in addition, they are stable, that is to say spontaneous crosslinking as a result of homopolymerisation does not take place.

The copolymers of the invention are crosslinkable in a controlled and extremely effective manner, especially by photo-crosslinking.

The present invention further relates, therefore, to a polymer that can be obtained by crosslinking thermally or, preferably, by photo-crosslinking a prepolymer obtainable by the above-described process, in the presence or, preferably, in the absence of an additional vinyl comonomer. These crosslinked polymers are water-insoluble.

In the photo-crosslinking, a photoinitiator capable of initiating free-radical crosslinking is suitably added.

Examples thereof will be familiar to the person skilled in the art, suitable photoinitiators that may specifically be mentioned being benzoin methyl ether, 1-hydroxy-cyclohexylphenyl ketone, Darocure® 1173 or 2959 or Irgacure® types. The crosslinking can then be brought about by actinic radiation, e.g. visible light, UV light, or ionising radiation, e.g. gamma rays or X-rays. The amount of photoinitiator may be selected within wide limits, an amount of from 0.01 to 1.5% by weight and especially of from 0.05 to 0.5% by weight, based in each case of the prepolymer contents, having proved beneficial.

The crosslinkable copolymer of the invention is introduced into the crosslinking process preferably in pure form, particularly substantially free from undesired constituents, such as, for example, free from monomeric, oligomeric or polymeric starting compounds used for the preparation of the prepolymer, and/or free from secondary products formed during the preparation of the prepolymer. Said prepolymers in pure form are obtained advantageously by previously purifying them in a manner known pr se, for example by precipitation with a suitable solvent, filtration and washing, extraction in a suitable solvent, dialysis, reverse osmoses (RO) or ultrafiltration, reverse osmoses and ultrafiltration being especially preferred.

The preferred purification processes for the prepolymers of the invention, reverse osmoses and ultrafiltration, can be carried out in a manner known per se. It is possible for the ultrafiltration and reverse osmoses to be carried out repeatedly, for example from two to ten times. Alternatively, the ultrafiltration and reverse osmoses can be carried out continuously until the selected degree of purity is attained. The selected degree of purity can in principle be as high as desired.

The copolymers of the invention may be crosslinked, for example, in form of a solution or a mesophase.

One embodiment of the invention relates to the photopolymerisation of the prepolymers of the invention in solution, preferably in an aqueous solution or in one or more different organic solvents. Suitable organic solvents are in principle all solvents that dissolve the polymers according to the invention and an optional vinyl comonomer which may be additionally used, e.g. alcohols, such as $C_1$-$C_6$-alkanols, e.g. n- or iso-propanol, ethanol or methanol, glycols such as ethylene glycol, diethylene glycol, propylene glycol, butylene glycol, carboxylic acid amides, such as dimethylformamide, or dimethyl sulfoxide, and mixtures of suitable solvents, e.g. mixtures of water with an alcohol, e.g. a water/propanol, water/ethanol or a water/methanol mixture, or mixtures of water with a glycol.

According to this embodiment of the invention, the photo-crosslinking is preferably effected from a solution comprising (i) one or more crosslinkable copolymers according to the invention which can be obtained as a result of the preferred purification step, ultrafiltration, (ii) one or more solvents selected from the group consisting of a $C_1$-$C_6$-alkanol, a glycol, a carboxylic acid amide, dimethyl sulfoxide and water, and optionally (iii) an additional vinyl comonomer. For example, photo-crosslinking of the prepolymers is carried out in water, in ethanol or n- or iso-propanol, or in a mixture of water and ethanol or n- or iso-propanol.

The vinyl comonomer that can additionally be used according to the invention in the photo-crosslinking may be hydrophobic or hydrophilic or may be a mixture of a hydrophobic and a hydrophilic vinyl monomer. Suitable vinyl monomers include especially those which are customarily used in the manufacture of contact lenses. The expression "hydrophilic vinyl monomer" is understood to mean a monomer that typically produces as homopolymer a polymer that is water-soluble or capable of absorbing at least 10% by weight water. Analogously, the expression "hydrophobic vinyl monomer" is understood to mean a monomer that typically produces as homopolymer a polymer that is water-insoluble or capable of absorbing less than 10% by weight water.

The proportion of vinyl comonomers, if used, is preferably from 5 to 60% by weight, especially from 10 to 30% by weight, of vinyl comonomer relative to the weight of prepolymers of the invention.

It is also preferred to use a hydrophobic vinyl comonomer or a mixture of a hydrophobic vinyl comonomer with a hydrophilic vinyl comonomer, the mixture containing at least 50% by weight of a hydrophobic vinyl comonomer. In that manner, the mechanical properties of the polymer can be improved without the water content being appreciably reduced. In principle, however, both conventional hydrophobic vinyl comonomers and conventional hydrophilic vinyl comonomers are suitable for copolymerisation with a prepolymer of the invention.

Suitable hydrophobic vinyl comonomers include, without the following being an exhaustive list, $C_1$-$C_{18}$alkyl acrylates and methacrylates, $C_3$-$C_{18}$alkylacrylamides and -methacrylamides, acrylonitrile, methacrylonitrile, vinyl-$C_1$-$C_{18}$alkanoates, $C_2$-$C_{18}$alkenes, $C_2$-$C_{18}$haloalkenes, styrene, $C_1$-$C_6$alkylstyrene, vinyl alkyl ethers in which the alkyl moiety has from 1 to 6 carbon atoms, $C_2$-$C_{10}$perfluoroalkyl acrylates and methacrylates or correspondingly partially fluorinated acrylates and methacrylates, $C_3$-$C_{12}$perfluoroalkyl-ethyl-thiocarbonylaminoethyl acrylates and methacrylates, acryloxy- and methacryloxy-alkyl-siloxanes, N-vinylcarbazole, $C_1$-$C_{12}$alkyl esters of maleic acid, fumaric acid, itaconic acid, mesaconic acid and the like. Preferred are, for example, $C_1$-$C_4$alkyl esters of vinylically unsaturated carboxylic acids having from 3 to 5 carbon atoms or vinyl esters of carboxylic acids having up to 5 carbon atoms.

Examples of suitable hydrophobic vinyl comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silylpropyl methacrylate, 3-methacryloxypropylpentamethyldisiloxane and bis(methacryloxypropyl) tetramethyldisiloxane.

Suitable hydrophilic vinyl comonomers include, without the following being an exhaustive list, hydroxy-substituted lower alkyl acrylates and methacrylates, acrylamide, methacrylamide, lower alkylacrylamide and -methacrylamide, ethoxylated acrylates and methacrylates, hydroxy-substituted lower alkylacrylamides and methacrylamides, hydroxy-substituted lower alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino-(the term "amino" also including quaternary ammonium), mono-lower alkylamino- or di-lower alkylamino-lower alkyl acrylates and methacrylates, allyl alcohol and the like. Preferred are, for example, hydroxy-substituted $C_2$-$C_4$alkyl (meth)acrylates, five- to seven-membered N-vinyl lactams, N,N-di-$C_1$-$C_4$alkyl-(meth)acrylamides and vinylically unsaturated carboxylic acids having a total of from 3 to 5 carbon atoms.

Examples of suitable hydrophilic vinyl comonomers include hydroxyethyl methacrylate, hydroxyethyl acrylate, acrylamide, methacrylamide, dimethylacrylamide, allyl alcohol, vinylpyridine, vinylpyrrolidine, glycerol methacrylate, N-(1,1 dimethyl-3-oxobutyl)-acrylamide and the like.

Preferred hydrophobic vinyl comonomers are methyl methacrylate and vinyl acetate. Preferred hydrophilic vinyl comonomers are 2-hydroxyethyl methacylate, N-vinylpyrrolidone and acrylamide. Most preferably, the crosslinking of the prepolymers of the invention is carried out in the absence of a vinylic comonomer.

According to another embodiment of the invention, the prepolymers of the invention are previously converted into an aqueous mesophase, and the aqueous mesophase is then subjected to photocrosslinking. A suitable process for producing an aqueous mesophase composition and its crosslinking in an ophthalmic mould is disclosed in PCT application WO 99/12059 and may be carried out accordingly with a prepolymer of the present invention.

The solutions or mesophases comprising a prepolymer of the invention may be processed in a manner known per se to form mouldings, especially ophthalmic mouldings such as contact lenses, for example by carrying out the photocrosslinking of the prepolymers of the invention in a suitable mould, in particular a contact lens mould. For example, the solution or mesophase is introduced into an opthalmic mould in a manner known per se, such as, especially, by conventional metering in, for example by dropwise introduction or by extrusion. Suitable moulds are generally customary contact lens moulds as known in the state of the art. Thus, the contact lenses according to the invention can be manufactured, for example, in a manner known per se, for example in a conventional "spin-casting mould", as described, for example, in US-A-3 408 429, or by the so-called Full-Mould process in a static mould, as described, for example, in US-A-4347198. Appropriate moulds are made, for example, from polypropylene. Quartz, sapphire glass and metals, for example, are suitable materials for re-usable moulds.

The crosslinking can be triggered in the mould, for example by actinic radiation, such as, for example, visible light or UV light, or by ionising radiation, such as, for example, gamma radiation, electron radiation or X radiation. The crosslinking can where appropriate also be triggered thermally or electrochemically. Attention is drawn to the fact that the photocrosslinking can be carried out in a very short time, for example in $\leq 30$ minutes, preferably $\leq 20$ minutes, more preferably $\leq 5$ minutes, even more preferably in $\leq 1$ minute, especially in 10 to 45 seconds, especially preferably, as disclosed in the examples.

The opening of the mould such that the moulding can be removed from the mould can be carried out in a manner known per se.

If the moulding manufactured according to the invention is a contact lens and the latter has been manufactured from a previously purified prepolymer of the invention, then it is normally unnecessary for the removal of the moulding to be followed by purification steps, e.g. extraction, because the prepolymers used do not contain any undesired low-molecular-weight constituents; consequently, the crosslinked product also is free or substantially free of such constituents and subsequent extraction can be dispensed with. The contact lens can accordingly be converted into a ready-for-use contact lens directly in conventional manner by solvent-exchange and hydration. Suitable forms of hydration capable of producing ready-for-use contact lenses with a wide variety of water contents are known to the person skilled in the art. The contact lens is swelled, for example, in water, in an aqueous salt solution, especially in an aqueous salt solution having an osmolarity of approximately from 200 to 450 milliosmol in 1000 ml (unit: mosma), preferably approximately from 250 to 350 mosm/l and especially approximately 300 mosma, or in a mixture of water or an aqueous salt solution with a physiologically tolerable polar organic solvent, for example glycerol. Swelling of the prepolymer in water or in aqueous salt solutions is preferred.

The aqueous salt solutions used for the hydration are advantageously solutions of physiologically tolerable salts, such as buffer salts customary in the field of contact lens care, e.g. phosphate salts, or isotonising agents customary in the field of contact lens care, such as, especially, alkali metal halides, e.g. sodium chloride, or solutions of mixtures thereof. An example of an especially suitable salt solution is a synthetic, preferably buffered, lachrymal fluid that has been matched to natural lachrymal fluid with regard to pH value and osmolarity, e.g. an unbuffered or preferably buffered, for example phosphate buffer-buffered, sodium chloride solution the osmolarity and pH value of which correspond to the osmolarity and pH value of human lachrymal fluid.

The hydration fluids defined above are preferably pure, that is to say free or substantially free of undesired constituents. Most preferably, the hydration fluid is pure water or a synthetic lachrymal fluid as described above.

If the moulding manufactured according to the invention is a contact lens and the latter has been manufactured from an aqueous solution or mesophase of a previously purified prepolymer of the invention, the crosslinked product also will not contain any troublesome impurities. There is normally no need, therefore, for subsequent extraction. Since the crosslinking is carried out in an aqueous medium, there is also no need for subsequent hydration. In accordance with an advantageous embodiment, therefore, the contact lenses obtainable by this process are distinguished by the fact that they are suitable for use as intended without extraction or hydration. The expression "use as intended" is understood in this context to mean especially that the contact lenses can be inserted into'the human eye.

The copolymers of the invention are especially suitable for the manufacture of mass-produced articles, such as, for example, contact lenses that are worn for a short time, for example for a month, a week or just one day, and are then replaced by new lenses. This is especially true if the contact lenses are prepared from an aqueous solution or mesophase of a copolymer of the invention which can be used on the eye without subsequent treatment steps, such as extraction or hydration.

The invention further relates to mouldings that comprise or, preferably, substantially consist of a crosslinked prepolymer of the invention. Further examples of mouldings of the invention, apart from contact lenses, are biomedical or special ophthalmic mouldings, e.g. intraocular lenses, artificial cornea, eye bandages, wound healing dressings, materials for the sustained release of an active compound such as a drug delivery patch, mouldings for use in surgery, such as heart valves, vascular grafts, catheters, artificial organs, encapsulated biologic implants, e.g. pancreatic islets, materials for prostheses such as bone substitutes and the like, mouldings for diagnostics, biomedical instruments, and films or membranes, e.g. membranes for controlling diffusion, photo-structurable films for information storage, or photoresist materials, e.g. membranes or mouldings for etch resists or screen print resists.

Biomedical mouldings, especially ophthalmic mouldings such as contact lenses obtainable according to the invention have a range of unusual and extremely advantageous properties. Among those properties, there may be mentioned, for example, their excellent compatibility with the human cornea, which is due to a balanced ratio of water content, oxygen permeability and mechanical properties. The contact lenses of the invention furthermore have a high dimensional stability. Even after autoclaving at, for example, approximately 120° C. no changes in shape can be detected.

One group of preferred crosslinked polymers obtainable according to the invention concerns those that are obtained from a prepolymer of the invention that is based on one or more hydrophilic monomers and a polysiloxane or perfluoroalkyl polyether crosslinker. Mouldings obtainable from said prepolymers are preferably at least partly bicontinuous, that is to say the mouldings have at least two partly bicontinuous phases, in particular an oxygen-permeable and an ion-permeable phase, which are intermingled. Owing to this structural feature, contact lenses and other biomedical articles obtainable from said prepolymers have a range of unusual and extremely advantageous properties and are therefore suited to extended periods of wear (true extended wear, i.e., seven days or more). Among these properties are, for example, their excellent compatibility with the human cornea and with tear fluid, if necessary after suitable surface treatment (e.g. coating), which is based on a balanced ratio between water content, oxygen permeability, ion permeability and mechanical and absorptive properties. This results in high comfort and the absence of irritation and allergenic effects. Owing to their favourable permeability properties with respect to gases ($CO_2$ and $O_2$), various salts, nutrients, water and diverse other components of tear fluid, the contact lenses prepared according to the process of the invention have no effect, or virtually no effect, on the natural metabolic processes in the cornea. Furthermore, the contact lenses obtainable according to the process are optical clear and transparent, have a high shelf life and good mechanical properties, for example concerning the modulus of elasticity, elongation at break or dimensional stability.

In the Examples which follow, amounts are by weight, unless specified otherwise, and temperatures are given in degrees Celsius.

EXAMPLE 1a

Preparation of a Polysiloxane Crosslinker 300 g $H_2O$, 30 g sodium chloride and 16 g of $Na_2CO_3$ are added to a solution of 200 g of di-aminopropyl-terminated polydimethylsiloxane (Shin-Etsu KF-8012, $M_n \approx 4000$) in 350 g pentane in a suitable reaction vessel. To the stirred mixture are added dropwise 10 ml of acryloyl chloride during about 60 minutes, while maintaining the mixture at room temperature. The reaction mixture is then stirred at room temperature for another 60 minutes.

The organic phase of the resulting two phase system is separated and dried with $MgSO_4$. After removal of the solvent on a rotary evaporator there is obtained the compound of formula

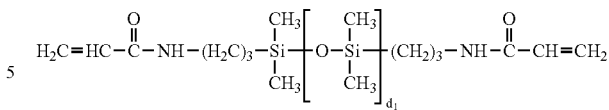

wherein $d_1$ is about $\approx 54$ at an average as a clear colorless liquid (0.48 meq/g double bonds).

EXAMPLES 1b-1c

The procedure of Example 1a is repeated using further di-aminopropyl-terminated polydimethylsiloxanes as indicated in the Table.

| Example | Polydimethyl siloxane | Number average molecular weight $M_n$ | Contents of double bonds [meq/g] |
|---|---|---|---|
| 1b | Sin-Etsu KF 8008 | 11300 | 0.175 |
| 1c | Genesee GP 654 | 7200 | 0.275 |

EXAMPLE 1d

A further crosslinker is prepared by mixing the product of Example 1b with the product of Example 1a in a weight ratio of 2.92:1 (0.25 meq/g double bonds).

EXAMPLE 1e 300 g $H_2O$, 30 g sodium chloride and 16 g of $Na_2CO_3$ are added to a solution of 200 g of di-aminopropyl-terminated polydimethylsiloxane (Shin-Etsu KF-8012, $M_w \approx 4000$) in 350 g pentane in a suitable reaction vessel. To the stirred mixture are added dropwise 1.97 g of oxalyl chloride followed by 10 ml of acryloyl chloride during about 60 minutes, while maintaining the mixture at room temperature. The reaction mixture is then stirred at room temperature for another 60 minutes and isolated according to Example 1a (0.252 meq/g double bonds).

EXAMPLE 1f

Preparation of a Bifunctional Chain Transfer Agent

To 10 g of Bis-(2-aminoethyl)-amine in a suitable vessel with thermometer and cooling equipment are slowly added 22 g of gamma-thiobutyrolacton while maintaining the mixture at 50° C. After complete addition, the reaction mixture is heated to 80° C. and the excess of gamma-butyrolacton is distilled of under reduced pressure. The crystalline product is dissolved in about 48 ml 2N HCl to give a pH value of 5. The aqueous solution is evaporated on a rotary evaporator and the product is then dried under vacuum at 80° C.

After recrystallization from ethanol, the product of formula

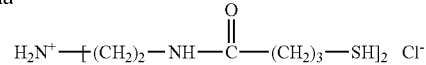

is obtained as a white crystalline product, mp:164.5° C.

EXAMPLE 2a

Preparation of an Amphiphilic Block Copolymer

A three-necked round bottom flask equipped with a magnetic stir bar, internal thermometer, intensive cooler and drying tube, is charged with a solution of 76 g of the polysiloxane crosslinker obtained according to Example 1a in 120 g of tetrahydrofurane (THF). The apparatus is evacuated and filled with nitrogen. This is repeated three times.

A second solution is prepared separately from 4.0 g cysteamine hydrochloride (chain transfer agent) and 340 g of ethanol (EtOH). 0.1 g azobisisobutyronitrile (AIBN) and 38 g N,N-dimethyl acrylamide (DMA) are added and the whole is degassed three times as described above. The resulting solution is then added to the first solution comprising the polysiloxane crosslinker, and the whole reaction mixture is again degassed three times. The mixture is heated for about eight hours to 65° C. and then cooled to room temperature. The product is purified by ultrafiltration and isolated by lyophilization. An analytical sample of the amine hydrochloride product is characterized by amine titration (0.1 meq/g), GPC and NMR.

EXAMPLES 2b-2k

Amphiphilic block copolymers with similar properties are obtained by repeating the procedure of Example 2a but using the amounts of compounds as outlined in the Table below.

| Ex. | crosslinker Ex./[g] | DMA [g] | chain transfer agent Ex./[g] | Solvent[1] | amine titration [meq/g] |
|---|---|---|---|---|---|
| 2b | 1a/18.3 | 7.7 | 2a/0.95 | EtOH/THF | 0.95 |
| 2c | 1a/18.9 | 15.0 | 2a/11.0 | EtOH/THF | n.m. |
| 2d | 1a/18.9 | 9.7 | 2a/0.75 | EtOH/THF | 0.08 |
| 2e | 1a/76.8 | 42 | 2a/4.0 | n-Propanol | 0.11 |
| 2f | 1b/19.6 | 13.9 | 2a/0.8 | n-Propanol | 0.06 |
| 2g | 1c/19.9 | 9.4 | 2a/0.6 | EtOH/THF | 0.054 |
| 2h | 1c/19.8 | 9.3 | 1f/1.7 | EtOH/THF | 0.056 |
| 2i | 1d/198.7 | 93.7 | 2a/5.8 | EtOH/THF | 0.055 |
| 2j | 1e/76.7 | 42 | 2a/2.7 | EtOH/THF | 0.063 |
| 2k | 1a/20.0 | 9.0 | 2a/0.9 | iso-Propanol | 0.073 |

[1]EtOH/THF each 2.8/1

EXAMPLE 2l

Preparation of an Amphiphilic Block Copolymer

A mixture of two α,ω-bisacrylamide-polydimethylsiloxanes, 120.1 g of Example 1b and 43.6 g of Example 1a, are added to a reactor equipped with heating mantle and thermostat, thermometer, reflux cooler, vacuum/$N_2$ connection, and mechanical stirrer. The reactor is thermostated to 15° C. and the PDMS mixture is degassed by 5 cycles of evacuation to 15 mbar and flushing with $N_2$.

77.03 g of distilled DMA are added to a 2 L roundbottom flask and dissolved in 831.3 g of 1-propanol. The solution is stirred with help of a magnetic stirring bar and degassed by two cycles of quick evacuation to 80 mbar and flushing with $N_2$, and then added to the reactor. 4.8 g of cysteamine.HCl are dissolved in 816 g of 1-propanol and the solution is degassed as described for the DMA solution (50 mbar) and added to the reactor. 0.86 g of AIBN are dissolved in 559 g of 1-propanol and the solution is degassed as described for the DMA solution (50 mbar) and added to the reactor.

The turbid mixture in the reactor is cooled to 8° C. and, while stirring vigorously, degassed by 4 cycles of evacuation to 25 mbar and flushing with $N_2$, after which it is kept under a slight $N_2$ overpressure. Subsequently the reactor is heated to 65° C., during which the reaction mixture becomes clear and colorless. The solution is stirred at 65° C. for 12 hrs and is then allowed to cool down to room temperature.

After that the reactor is opened and a sample is taken for thin layer chromatography, confirming the absence of residual DMA.

About half of the solvent is distilled from the reactor under reduced pressure, water is added to the solution, and the remaining solvent is distilled off, yielding an aqueous emulsion of the product.

A sample is taken from the emulsion and freeze-dried. Another sample is taken and purified by ultrafiltration over a membrane with a nominal molecular weight limit of 10 kmol/g, followed by freeze-drying, yielding a white solid. Comparison of the $^1$H NMR spectra of both products showed that about 53% of the DMA has been built into the copolymer.

EXAMPLE 3a

Preparation of a Crosslinkable Amphiphilic Block Copolymer 50 volume-% of the solvent (ethanol and THF) of the reaction mixture obtained in Example 2a before ultrafiltration are removed on a rotary evaporator. Water is then added and the remaining solvent is removed on a rotary evaporator until a total amount of about 1000 ml emulsion is reached, and the temperature of the reaction mixture is adjusted to about 0° C. After the addition of a buffer (10 g $NaHCO_3$), about 8 ml of acryloyl chloride are added dropwise to the reaction mixture at a ratio of about 0.8 ml/minute while the pH is kept constant at a value of 9 by the addition of 15% aqueous sodium hydroxide solution. The pH is then adjusted to 7 and the reaction mixture is first filtered using a G-3 frit and is then purified by ultrafiltration with water using a 300 kD membrane. After concentration a 10 to 20% aqueous emulsion of the crosslinkable product is obtained which upon lyophilization yields a white solid.

EXAMPLES 3b-3k

Crosslinkable amphiphilic block copolymers with similar properties are obtained by repeating Example 3a but using the amphiphilic block copolymer of Examples 2b-2k.

EXAMPLE 3l

Preparation of a Crosslinkable Amphiphilic Block Copolymer

The residual emulsion obtained in Example 2l is transferred to a 2 L beaker equipped with a mechanical stirrer; 4.0 g of $NaHCO_3$ are added and the mixture is cooled to 1° C. with an ice bath. The pH is adjusted to 9.5 and kept at that value with 15% aqueous NaOH, and 15 mL of acryloyl-chloride are added at a rate of 0.30 mL/min.

After the addition is complete the emulsion is purified by ultrafiltration over a membrane with a nominal molecular weight limit of 10 kmol/g, followed by freeze-drying, yielding a white solid.

EXAMPLES 4a-4k

Preparation of a Contact Lens

A centrifugation tube is charged with 2.3 g of a product from one of Examples 3a to 3k and 1.0 g ethanol containing 0.3 weight percent of photoinitiator Darocur® 2959. The components are thoroughly mixed until a homogeneous viscous solution is formed. The formulation is centrifuged at 5000 rpm for 10 minutes to remove air bubbles.

Portions of the formulation are filled into polypropylene contact lens moulds and cured by UV-irradiation for 15 to 25 seconds with a UV intensity of 1.6 mW/cm$^2$ (Macam-lamp). After mould opening and hydratization perfectly clear and colorless contact lenses (water contents Ex. 4a about 20% by weight; Ex. 4b about 30% by weight; Ex. 4c about 23% by weight, Ex. 4d n.m., Ex. 4e about 19% by weight, Ex. 4f about 27% by weight, Ex. 4g about 28% by weight, Ex. 4h about 25% by weight, Ex. 4i about 20% by weight, Ex. 4j about 26% by weight, Ex. 4k about 19% by weight,) having a high ion permeability and oxygene permeability as well as good mechanical properties, for example concerning the E-modulus and elongation at break, are obtained in each case.

EXAMPLE 4l

Preparation of a Contact Lens

A sample of the macromonomer obtained according to Example 3l is dissolved in dichloromethane. The solution is pressure filtered through a 1.2 μm filter and the solvent is removed by rotary evaporation. Of the resulting waxy material 2.3 g are mixed with 1.0 g of 2-methyl-1-pentanol containing the photoinitiator Darocur® 2959, yielding a clear and colorless formulation (viscosity=7.6 Pa·s, 70.5 wt % solids, 0.30 wt % of photoiniliator relative to solids).

Formulations are cast in polypropylene molds and cured for 15 seconds with UV light at an intensity of 1.6 mW/cm$^2$ at 310 nm with a Macam lamp (400W). Following extraction in ethanol and autoclaving, clear, transparent, and elastic lenses having a water contents of 24% by weight, and having high ion permeability and oxygen permeability values in combination with good mechanical properties are obtained in each case. Suitable methods for the determination of the ion permeability or oxygen permeability are described, for example, in U.S. Pat. No. 5,807,944.

EXAMPLE 5

Preparation of a Hydrogel Contact Lens 23.7 g of bis(2-aminopropyl)polyethylene glycol 2000 are converted to the corresponding bis-acrylamide compound in THF using the method as outlined in Example 1a. 10.2 g of the bis(2-acrylamidopropyl) polyethylene glycol, 8.0 g of DMA and 1.0 g of cysteamine hydrochloride are reacted using the method of Example 2 but using water as solvent and 1,1-azodiisobutyramidine as catalyst to yield a DMA/PEG block copolymer having amine functionalization. The amino groups of the copolymer are converted into acrylamido groups using the method of Example 3a.

Contact lenses are obtained by preparing a 30% aqueous solution of the above obtained crosslinkable copolymer, adding 0.3% (based on polymer content) of the photoinitiator Irgacure 2959, and irradiating for about 15-30 seconds in a transparent contact lens mould of polypropylene using a UV intensity of 1.6 mW/cm$^2$ (Macam lamp). The lenses are removed from the mould; they are optical clear and have good mechanical properties.

EXAMPLE 6

Preparation of a Low-molecular Weight Polyvinyl Alcohol Crosslinker

To 380 g of an aqueous solution of Nelfilcon A (acrylate-modified PVA, solids content 10%, synthesis in analogy to EP-A-641806, Example 15i)) are added 2.2 g of $H_5IO_6$ in 20 ml of water and the pH is adjusted to 7 with $Na_2CO_3$ solution. The resulting solution is purified by ultrafiltration using a 1 kD membrane to yield a low-molecular weight PVA crosslinker (solids content 13.7% by weight).

EXAMPLE 7

Preparation of a Moulding 77.2 g of the aqueous PVA crosslinker solution obtained according to Example 6 (10.6 g of crosslinker) are degassed and flushed with nitrogen. 1.5 g of cysteamine hydrochloride, 4.78 g of DMA and 0.1 g of 1,1-azodiisobutyramidine are added. The reaction mixture is degassed three times and is then polymerized for about 8 hours at 50° C. The solution of the polymer is then treated with excess acryloyl chloride at pH 9 and a temperature of 0° C. After neutralization the resulting reaction solution is purified by ultrafiltration using a 1 kD membrane to yield a crosslinkable prepolymer.

To a 30% by weight solution of the crosslinkable prepolymer are added 0.1% by weight of a photoinitiator (Irgacure 2959). From the clear viscous solution, a 0.1 mm thick film is produced between glass plates with spacers. The film is exposed to a UV lamp for 15 seconds. A clear film is obtained which forms a clear hydrogel in water.

EXAMPLE 8

Preparation of a Moulding 2.3 of DMA, 1.0 g of N,N'-(1,2-dihydroxyethylene)-bis-acrylamide, 1.0 g of cysteamine hydrochloride and 0.1 g of 1,1-azodiisobutyramidine are mixed and degassed three times. The reaction mixture is then polymerized under nitrogen for about 8 hours at 50° C. The solution of the polymer is treated with excess acryloyl chloride at pH 9 and a temperature of 0° C. After neutralization the resulting reaction solution is purified by ultrafiltration using a 1 kD membrane to yield a crosslinkable prepolymer.

To a 35% by weight aqueous solution of the crosslinkable prepolymer are added 0.1% by weight of a photoinitiator (Irgacure 2959). From the clear viscous solution, a 0.1 mm thick film is produced between glass plates with spacers. The film is exposed to a UV lamp for 15 seconds. A clear film is obtained which forms a clear hydrogel in water.

The invention claimed is:

1. A hydrogel contact lens, comprising a polymer obtained by crosslinking or polymerized a solution of a prepolymer,
   wherein the prepolymer is a reaction product of an organic compound with a copolymer,
   wherein the copolymer includes first reactive groups and is a copolymerization product of a mixture comprising
   (a) at least one hydrophilic monomer having one first ethylenically unsaturated group; wherein the hydrophilic monomer is a monomer which, when polymerized, gives a homopolymer which is water-soluble or can absorb at least 10% by weight of water,
(b) at least one crosslinker comprising two or more second ethylenically unsaturated groups; wherein said at least one crosslinker is a polysiloxane, a perfluoroalkyl polyether, or a polysiloxane/perfluoroalkyl polyether block copolymer, and
(c) a chain transfer agent comprising a chain transfer group and a first reactive group, wherein the organic compound comprises a third ethylenically unsaturated group and a second reactive group which reacts with one of the first reactive groups of the copolymer to form a covalent linkage, wherein the prepolymer can be crosslinked or polymerized to form a polymeric material capable of forming a hydrogel when contacted with water.

2. A hydrogel contact lens of claim 1, wherein the hydrophilic monomer has a formula of (1a) or (1b)

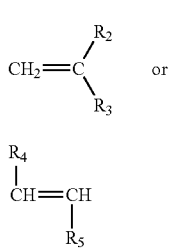

(1a)

(1b)

wherein $R_2$ is hydrogen or $C_1$-$C_4$-alkyl;

$R_4$ is $C_1$-$C_4$-alkyl, phenyl or a radical —C(O)OY$_9$, wherein $Y_9$ is hydrogen or unsubstituted or hydroxy-substituted $C_1$-$C_4$-alkyl;

$R_5$ is a radical —C(O)Y$_9$' or —CH$_2$—C(O)OY$_9$' wherein $Y_9$' independently has the meaning of $Y_9$; and $R_3$ is (i) a non-ionic substituent selected from the group consisting of
 a) $C_1$-$C_6$-alkyl which is substituted by one or more same or different substituents selected from the group consisting of —OH and —NRR', wherein R and R' are each independently of another hydrogen or unsubstituted or hydroxy-substituted $C_1$-$C_6$-alkyl or phenyl;
 b) phenyl which is substituted by hydroxy or —NRR', wherein R and R' are as defined above;
 c) a radical —COOY, wherein Y is $C_1$-$C_2$-alkyl, $C_1$-$C_{12}$-alkyl which is substituted by hydroxy, —NRR', a radical —O—(CH$_2$CH$_2$O)$_{1-24}$-E, or a radical —NH—C(O)—O-G, wherein R and R' are as defined above, wherein E is hydrogen or $C_1$-$C_6$-alkyl, wherein —O-G is the radical of a saccharide with 1 to 8 sugar units or is a radical —O—(CH$_2$CH$_2$O)$_{1-24}$-E;
 d) —CONY$_1$Y$_2$, wherein $Y_1$ and $Y_2$ are each independently hydrogen, $C_1$-$C_4$-alkyl, $C_1$-$C_{12}$-alkyl which is substituted by hydroxy, $C_1$-$C_4$-alkoxy, a radical —CH(OR$_{18}$)$_2$, $C_1$-$C_4$-alkyl, $C_2$-$C_5$-alkanoyl, or a radical —O—(CH$_2$CH$_2$O)$_{1-24}$-E, wherein $R_{18}$ is hydrogen, $C_1$-$C_4$-alkyl or $C_2$-$C_5$-alkanoyl, wherein E is as defined above, or $Y_1$ and $Y_2$ together with the adjacent N-atom form a fiveor six-membered heterocyclic ring having no additional heteroatom or one additional oxygen or nitrogen atom; and
 e) a radical —OY$_3$, wherein $Y_3$ is hydrogen, $C_1$-$C_2$-alkyl, acetyl, $C_1$-$C_{12}$-alkyl which is substituted by —NRR', or a radical —C(O)—C$_1$-$C_2$-alkyl, wherein R and R' are as defined above or together are a five- to seven-membered heterocyclic radical having at least one N-atom and being bound in each case via said nitrogen atom;

(ii) an anionic substituent selected from the group consisting of
 a) $C_1$-$C_6$-alkyl which is substituted by —SO$_3$H, —OSO$_3$H, —OPO$_3$H$_2$ and —COOH;
 b) phenyl which is substituted by one or more same or different substituents selected from the group consisting of —SO$_3$H, —COOH, —OH and —CH$_2$—SO$_3$H;
 c) —COOH;
 d) a radical —COOY$_4$, wherein $Y_4$ is $C_1$-$C_{24}$-alkyl which is substituted by —COOH, —SO$_3$H, —OSO$_3$H, —OPO$_3$H$_2$, or a radical —NH—C(O)—O-G', wherein G' is the radical of an anionic carbohydrate;
 e) a radical —CONY$_5$Y$_6$, wherein $Y_5$ is $C_1$-$C_{24}$-alkyl which is substituted by —COOH, —SO$_3$H, —OSO$_3$H, or —OPO$_3$H$_2$, wherein $Y_6$ independently has the meaning of $Y_5$ or is hydrogen or $C_1$-$C_{12}$-alkyl; and
 f) —SO$_3$H or a salt thereof;

(iii) a cationic substituent selected from the group consisting of
 a) $C_1$-$C_{12}$-alkyl which is substituted by a radical —NRR'R''$^+$An$^-$, wherein R, R' and R'' are each independently of another hydrogen or unsubstituted or hydroxy-substituted $C_1$-$C_6$-alkyl or phenyl, wherein An$^-$ is an anion; and
 b) a radical —C(O)OY$_7$, wherein $Y_7$ is $C_1$-$C_{24}$-alkyl which is substituted by —NRR'R''$^+$An$^-$ and is further unsubstituted or substituted by hydroxy, wherein R, R', R'' and An$^-$ are as defined above; or (iv) a zwitterionic substituent —R$_1$-Zw, wherein $R_1$ is a direct bond or a carbonyl, carbonate, amide, ester, dicarboanhydride, dicarboimide, urea or urethane group, and wherein Zw is an aliphatic moiety comprising one anionic and one cationic group each.

3. A hydrogel contact lens of claim 1, wherein the hydrophilic monomer has formula (1a)

(1a)

wherein $R_2$ is hydrogen or methyl and $R_3$ is a non-ionic substituent selected from the group consisting of —COO—$C_1$-$C_2$-alkyl, —COO—(CH$_2$)$_{2-4}$—OH, —CONH$_2$, —CON(CH$_3$)$_2$, —CONH—(CH$_2$)$_2$—OH, —CONH—(CH$_2$)$_{1-3}$—CH(OC$_1$-$C_2$-alkyl),

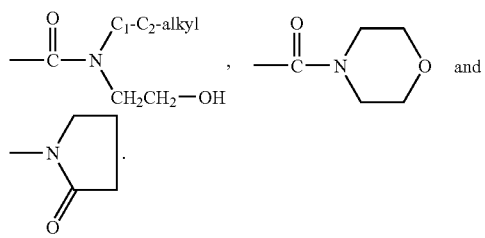 and 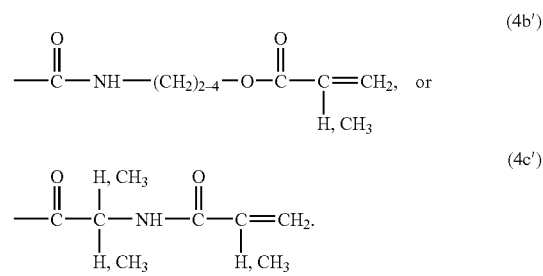

4. A hydrogel contact lens of claim 1, wherein the crosslinker is a polysiloxane of formula

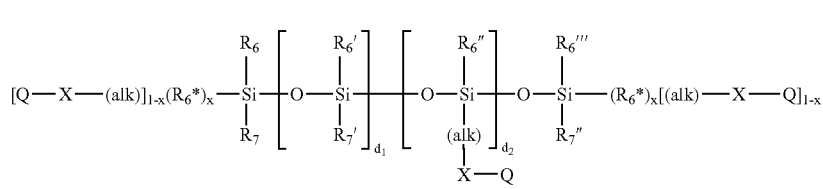

in which (alk) is alkylene having up to 20 carbon atoms which may be interrupted by —O—; X is —O— or —NR$_8$—, R$_8$ is hydrogen or C$_1$-C$_6$-alkyl, Q is an organic radical comprising a crosslinkable or polymerizable group, 80-100% of the radicals R$_6$, R$_6$', R$_6$'', R$_6$''', R$_6$*, R$_7$, R$_7$' and R$_7$'', independently of one another, are C$_1$-C$_8$-alkyl and 0-20% of the radicals R$_6$, R$_6$', R$_6$'', R$_6$''', R$_6$*, R$_7$, R$_7$' and R$_7$'', independently of one another, are unsubstituted or C$_1$-C$_4$ alkyl- or C$_1$-C$_4$-alkoxy-substituted phenyl, fluoro(C$_1$-C$_{18}$-alkyl), cyano(C$_1$-C$_{12}$-alkyl), hydroxy-C$_1$-C$_6$-alkyl or amino-C$_1$-C$_6$-alkyl, x is the number 0 or 1, d$_1$ is an integer of from 5 to 700, d$_2$ is an integer from 0 to 8 if x is 0, and is 2 to 10 if x is 1, and the sum of (d$_1$+d$_2$) is from 5 to 700.

5. A hydrogel contact lens of claim 1, wherein the crosslinker is a polysiloxane of formula

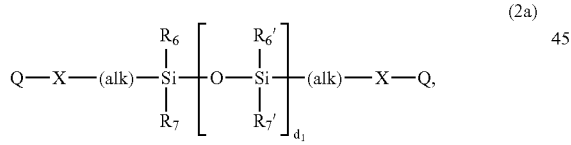

wherein R$_6$, R$_6$', R$_7$ and R$_7$' are each methyl, d$_1$ is an integer from 10 to 300, (alk) is linear or branched C$_2$-C$_6$ alkylene or a radical —(CH$_2$)$_{1-3}$—O—(CH$_2$)$_{1-3}$—, X is —O— or —NH— and Q is a radical of the formula

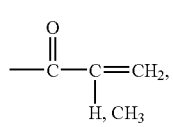

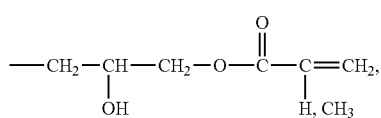

6. A hydrogel contact lens of claim 1, wherein the functional chain transfer agent used in step (a) is an organic primary thiol having a hydroxy, amino, N—C$_1$-C$_6$-alkylamino or carboxy group.

7. A hydrogel contact lens of claim 1, wherein, the components in step (a) are used in a molar ratio of from 0.5 to 5 equivalents chain transfer agent: 1 equivalent crosslinker: 5 to 60 equivalents hydrophilic monomer(s).

8. A hydrogel contact lens of claim 1, wherein the organic compound is described by formula

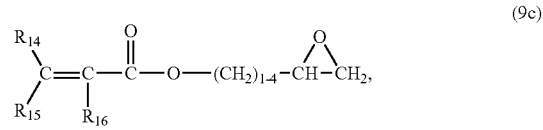

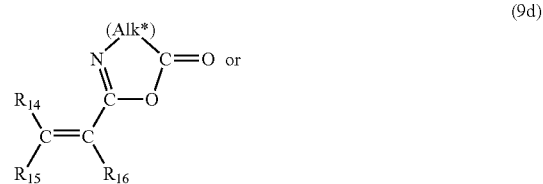

-continued

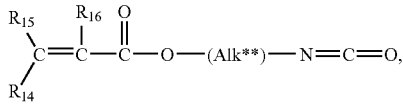

wherein $R_{13}$ is halogen, hydroxy, unsubstituted or hydroxy-substituted $C_1$-$C_6$-alkoxy or phenoxy, $R_{14}$ and $R_{15}$ are each, independently of the other, hydrogen, $C_1$-$C_4$-alkyl, phenyl, carboxy or halogen, $R_{16}$ is hydrogen, $C_1$-$C_4$-alkyl or halogen, $R_{17}$ and $R_{17}'$ are each an ethylenically unsaturated radical having from 2 to 6 C-atoms, or $R_{17}$ and $R_{17}'$ together form a bivalent radical —C($R_{14}$)=C($R_{16}$)— wherein $R_{14}$ and $R_{16}$ are as defined above, and (Alk*) is $C_1$-$C_6$-alkylene, and (Alk**) is $C_2$-$C_{12}$-alkylene.

9. A hydrogel contact lens of claim 1, wherein the crosslinker is a perfluoroalkyl polyether of formula Q-(PFPE-L)$_{n-1}$-PFPE-Q    (5), wherein n is ≧1, each PFPE may be the same or different and is a perfluorinated polyether of formula —OCH$_2$CF$_2$O(CF$_2$CF$_2$O)$_z$(CF$_2$O)$_y$CF$_2$CH$_2$O—    (6)

wherein the CF$_2$CF$_2$O and CF$_2$O units may be randomly distributed or distributed as blocks throughout the chain and wherein z and y may be the same or different such that the weight average molecular weight of the perfluoropolyether is in the range of from 500 to 4,000; wherein L is a difunctional linking group; and wherein Q is an organic radical comprising a crosslinkable or polymerizable group.

10. A hydrogel contact lens of claim 1, wherein the crosslinker is a macromonomer of the formula (5a)

Q-PFPE-Q    (5a)

wherein Q is an organic radical comprising a crosslinkable or polymerizable group; PFPE is a perfluorinated polyether of formula (6)

—OCH$_2$CF$_2$O(CF$_2$CF$_2$O)$_z$(CF$_2$O)$_y$CF$_2$CH$_2$O—    (6)

wherein z and y may be the same or different such that the molecular weight of the perfluoroalkyl polyether is in the range of from 500 to 2,500.

11. A hydrogel contact lens of claim 1, wherein the crosslinker is a polysiloxane/perfluoroalkyl polyether block copolymer of the formula

Q-PFPE-L-M-L-PFPE-Q    (7)

wherein

L is a difunctional linking group;

Q is an organic radical comprising a crosslinkable or polymerizable group;

PFPE is a perfluorinated polyether of formula (6)

—OCH$_2$CF$_2$O(CF$_2$CF$_2$O)$_z$(CF$_2$O)$_y$CF$_2$CH$_2$O—    (6)

in which z and y may be the same or different such that the molecular weight of the perfluoroalkyl polyether is in the range of from 500 to 2,500; and M is a radical of formula (2b)

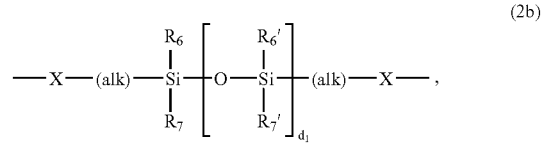

in which $R_6$, $R_6'$, $R_7$ and $R_7'$ are each methyl, di is an integer from 10 to 300, (alk) is linear or branched $C_2$-$C_6$ alkylene or a radical —(CH$_2$)$_{1-3}$—O—(CH$_2$)$_{1-3}$—, X is —O— or —NH—, wherein the weight average molecular weight of the segment of formula (2b) is in the range of from 180 to 6000.

* * * * *